United States Patent
He et al.

(10) Patent No.: US 12,547,298 B2
(45) Date of Patent: Feb. 10, 2026

(54) DISPLAY METHOD AND ELECTRONIC DEVICE

(71) Applicant: Huawei Technologies Co., Ltd., Shenzhen (CN)

(72) Inventors: Shujie He, Wuhan (CN); Puliang Luo, Wuhan (CN); Qianqiao Hu, Wuhan (CN); Dapeng Zhang, Wuhan (CN); Binfei Li, Shenzhen (CN); Xiong Zhuang, Wuhan (CN); Hongjun Liao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 18/263,279

(22) PCT Filed: Dec. 16, 2021

(86) PCT No.: PCT/CN2021/138628
§ 371 (c)(1),
(2) Date: Jul. 27, 2023

(87) PCT Pub. No.: WO2022/160999
PCT Pub. Date: Aug. 4, 2022

(65) Prior Publication Data
US 2024/0086035 A1 Mar. 14, 2024

(30) Foreign Application Priority Data
Jan. 28, 2021 (CN) .......................... 202110120962.0

(51) Int. Cl.
*G06F 3/0482* (2013.01)
*G06F 3/01* (2006.01)
*G06F 3/0488* (2022.01)

(52) U.S. Cl.
CPC ............ *G06F 3/0482* (2013.01); *G06F 3/016* (2013.01); *G06F 3/0488* (2013.01)

(58) Field of Classification Search
CPC ....... G06F 3/0482; G06F 3/016; G06F 3/0488
See application file for complete search history.

(56) References Cited

U.S. PATENT DOCUMENTS

| 10,338,937 B2 * | 7/2019 | Rist .......................... G06F 9/451 |
| 2002/0130904 A1 | 9/2002 | Becker et al. |

(Continued)

FOREIGN PATENT DOCUMENTS

| CN | 103488389 A | 1/2014 |
| CN | 103559033 A | 2/2014 |

(Continued)

OTHER PUBLICATIONS

MightyText.Net (published Jan. 21, 2021) (available at https://web.archive.org/web/20210121003919/https://mightytext.net/) (Year: 2021).*

(Continued)

*Primary Examiner* — Shahid K Khan
(74) *Attorney, Agent, or Firm* — Conley Rose, P.C.

(57) ABSTRACT

A display method includes an electronic device that runs a first application and displays a first interface in a form of a floating window in response to a first operation. The first interface includes a first title bar and a first content display part. The electronic device displays a second interface in response to a second operation. The second interface includes the first title bar, the first content display part, and a second content display part adjacent to the first content display part. The first title bar includes a first subtitle label corresponding to the second content display part.

20 Claims, 29 Drawing Sheets

(56) References Cited

U.S. PATENT DOCUMENTS

| | | | | |
|---|---|---|---|---|
| 2007/0016875 A1* | 1/2007 | Santos-Gomez | ..... | G06F 3/0481 |
| | | | | 715/781 |
| 2011/0175930 A1* | 7/2011 | Hwang | ............... | G06F 3/04886 |
| | | | | 345/660 |
| 2012/0260213 A1* | 10/2012 | Yang | ..................... | G06F 3/0483 |
| | | | | 715/810 |
| 2013/0305184 A1 | 11/2013 | Kim et al. | | |
| 2019/0104259 A1* | 4/2019 | Angquist | ............... | G11B 27/34 |
| 2021/0185244 A1* | 6/2021 | Boyd | .................. | G06F 3/04847 |

FOREIGN PATENT DOCUMENTS

| | | | | |
|---|---|---|---|---|
| CN | 105867937 A | | 8/2016 | |
| CN | 109388463 A | * | 2/2019 | ........... G06F 3/0481 |
| WO | 2019037359 A1 | | 2/2019 | |

OTHER PUBLICATIONS

Li, S., et al., "Multi-label Data Mining: A Survey," Computer Science vol. 40 No. 4, Apr. 2013, with English abstract, total 8 pages.

\* cited by examiner

FROM

DISPLAY METHOD AND ELECTRONIC DEVICE

CROSS-REFERENCE TO RELATED APPLICATIONS

This application is a National Stage of International Application No. PCT/CN2021/138628 filed on Dec. 16, 2021, which claims priority to Chinese Patent Application No. 202110120962.0, filed on Jan. 28, 2021, both of which are hereby incorporated by reference in their entireties.

TECHNICAL FIELD

This application relates to the field of electronic technologies, and in particular, to a display method and an electronic device.

BACKGROUND

In the Android system, most content viewed by a user in an application is provided by an activity (activity) component. One application may include a plurality of activities. For example, after the user taps an icon of an application, an activity 1 is started, and a home page of the application is displayed on a display interface of an electronic device. After the user taps an element on the home page, it may be considered that an activity 2 is started, and the display interface of the electronic device jumps from the home page of the application to another interface. That is, an interface corresponding to the activity 2 covers an interface corresponding to the activity 1. Consequently, the user can view only the current display interface.

SUMMARY

This application provides a display method and an electronic device, to display a plurality of interfaces in an application, so that a user can view content on a plurality of new opened interfaces when browsing an original interface. This improves visual effect of the application, and improves user experience.

According to a first aspect, a display method is provided. The method is applied to an electronic device, and the method includes: The electronic device runs a first application and displays a first interface in a form of a floating window in response to a first operation. The first interface includes a first title bar and a first content display part. The electronic device displays a second interface in response to a second operation. The second interface includes the first title bar, the first content display part, and a second content display part adjacent to the first content display part. The first title bar includes a first subtitle label corresponding to the second content display part.

The first operation may be an operation of starting the first application by a user. For example, the user taps an icon of the first application, or the user taps and holds an icon of the first application to select a startup manner, or the user clicks an icon of the first application by using a mouse.

The second operation may be that the user taps a first element in the first content display part. The first element may be a control. The second operation may be understood as starting a new activity.

The first title bar may further include the application icon, an application name, and the like of the first application. In this embodiment of this application, the second content display part is adjacent to the first content display part, and the second content display part may be located on the right side of the first content display part, or may be located on the left side of the first content display part. In this embodiment of this application, "adjacent" may mean that the second content display part does not overlap the first content display part, or "adjacent" may mean that at least one side of the second content display part overlaps at least one side of the first content display part.

According to this embodiment of this application, when the electronic device detects, on a home page of an application, that the user starts a new activity, a display interface of the newly started activity does not cover an original interface, but is displayed in a form of an extended interface at a location adjacent to the home page, and does not overlap the home page of the application. According to this technical solution, a plurality of interfaces in the application can be displayed, so that the user can view content on a plurality of new opened interfaces when browsing the original interface. This improves visual effect of the application and improves user experience.

Optionally, the electronic device may alternatively be in a desktop mode. For example, the electronic device detects an external keyboard or a virtual keyboard, or the electronic device is a projected device.

With reference to the first aspect, in an implementation of the first aspect, before the electronic device displays the second interface in response to the second operation, the method further includes: In response to the second operation, the electronic device obtains the first subtitle label by using a first configuration file.

For example, the electronic device may obtain the first subtitle label by invoking or accessing an Android.manifest.xml file. The first subtitle label may be a title name of an activity corresponding to the second content display part.

With reference to the first aspect, in an implementation of the first aspect, before the electronic device displays the second interface in response to the second operation, the method further includes: The electronic device generates the first subtitle label in response to the second operation.

For example, if the electronic device detects a second operation of the user, for example, starting a new activity 1, the electronic device may generate the first subtitle label, and add the subtitle label to the first title bar. The first subtitle label may be a label 1 that serves as an identifier, or the like. It should be understood that, when the user starts an activity 2, another subtitle label, for example, a label 2, may be generated and added to the first title bar.

With reference to the first aspect, in an implementation of the first aspect, the first title bar includes the highlighted first subtitle label. The first subtitle label includes a first label name and a control for closing the second content display part. The first subtitle label is located above the second content display part.

In this embodiment of this application, the first tag name may be a title name of an activity corresponding to the second content display part. For example, the first label name may be obtained by the electronic device by invoking android.manifest.xml. The first tag name may alternatively be a label 1 used for identification, or the like.

According to this embodiment of this application, the first title display bar includes the highlighted first subtitle label. This technical solution helps remind the user of a currently opened interface.

With reference to the first aspect, in an implementation of the first aspect, the method further includes: The electronic device displays a third interface in response to a third operation. The third interface includes the first title bar, the first content display part, and a third content display part adjacent to the first content display part. The first title bar includes a highlighted second subtitle label. The first subtitle label becomes non-highlighted. The second subtitle label includes a second label name and a control for closing the third content display part.

The technical solution helps the user browse a display interface in a plurality of windows corresponding to an application. This improves multi-screen collaboration experience. In addition, the highlighted second subtitle control better serves as an identifier.

With reference to the first aspect, in an implementation of the first aspect, the method further includes: The electronic device displays the second interface in response to a fourth operation of the user. The first subtitle label in the first title bar becomes highlighted, and the second subtitle label becomes non-highlighted.

In this embodiment of this application, the fourth operation may be an operation of tapping the first subtitle label by the user, or another operation used for switching. According to this technical solution, the home page of the application may continue to be displayed, and switching between the second display part and the third content display part is performed based on an operation of the user. This improves multi-screen collaboration experience.

With reference to the first aspect, in an implementation of the first aspect, a sum of side lengths of the first content display part and the second content display part in a first direction is less than or equal to a length of a side that is of a display desktop of the electronic device and that is parallel to the first direction.

According to this embodiment of this application, display sizes of the first content display part and the second content display part in the first direction are limited within the display desktop, to avoid incomplete display of content on an extended interface of the application.

With reference to the first aspect, in an implementation of the first aspect, a first side length of the first content display part in the first direction is less than or equal to a second side length of the second content display part in the first direction.

With reference to the first aspect, in an implementation of the first aspect, the first side length and the second side length are adjustable, and a sum of the first side length and the second side length remains unchanged.

According to this embodiment of this application, the user can change a size of a display interface based on an actual requirement. This improves user experience.

With reference to the first aspect, in an implementation of the first aspect, the method further includes: The electronic device runs a second application and displays a fifth interface of the second application in the form of a floating window in response to a fifth operation.

According to this embodiment of this application, the electronic device can further start the second application, and a display interface of the second application is also suspended on the display desktop of the electronic device. This technical solution helps the user simultaneously use a plurality of applications for collaborative office and the like. This improves user experience.

With reference to the first aspect, in an implementation of the first aspect, before the electronic device runs the first application and displays the first interface in the form of a floating window in response to the first operation, the method further includes: The electronic device determines that the first application supports changing a size of a display interface.

According to this embodiment of this application, when determining that the first application supports changing the size of the display interface, the electronic device may start the first application in the form of a floating window. It should be understood that whether the application supports changing the size of the display interface may be specified by a developer of the application when developing the application.

Optionally, when determining that the first application does not support changing the size of the display interface, the electronic device may start the application in full screen, or start the application in the form of a floating window, but a layout and a scale of the display interface of the application may change.

With reference to the first aspect, in an implementation of the first aspect, the method further includes: The electronic device determines that the first application supports a multi-window active state.

According to this embodiment of this application, when determining that the first application supports the multi-window active state, the electronic device may start the first application in the form of a floating window. It should be understood that whether the application supports the multi-window active state may be specified by a developer of the application when developing the application.

Optionally, when determining that the first application does not support the multi-window active state, the electronic device may start the application in full screen, or start the application in the form of a floating window, but a layout and a scale of the display interface of the application may change.

With reference to the first aspect, in an implementation of the first aspect, both the first content display part and the second content display part are in an active state.

In this embodiment of this application, that both the first content display part and the second content display part are in the active state may be understood as that both the first content display part and the second content display part are focus points of a display of the electronic device.

With reference to the first aspect, in an implementation of the first aspect, the first title bar further includes a first control for closing the first application, a second control for maximizing display of the first application, and a third control for minimizing display of the first application.

According to a second aspect, an electronic device is provided, including one or more processors and one or more memories. The one or more memories store one or more computer programs. The one or more computer programs include instructions. When the instructions are executed by the one or more processors, the display method according to any one of the first aspect or the possible implementations of the first aspect is performed.

According to a third aspect, a chip is provided. The chip includes a processor and a communication interface. The communication interface is configured to: receive a signal and transmit the signal to the processor. The processor processes the signal, so that the display method according to any one of the first aspect or the possible implementations of the first aspect is performed.

According to a fourth aspect, a computer-readable storage medium is provided. The computer-readable storage medium stores computer instructions. When the computer instructions are run on a computer, the display method according to any one of the first aspect or the possible implementations of the first aspect is performed.

According to a fifth aspect, a computer program product is provided, including computer instructions. When the computer instructions are run on an electronic device, the display method according to any one of the first aspect or the possible implementations of the first aspect is performed.

BRIEF DESCRIPTION OF DRAWINGS

FIG. 5(a)-1 to FIG. 5(c) are schematic diagrams of another group of GUIs according to an embodiment of this application;

DESCRIPTION OF EMBODIMENTS

The following describes the technical solutions in embodiments of this application with reference to the accompanying drawings in embodiments of this application. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in descriptions of embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature restricted by "first" or "second" may explicitly or implicitly include one or more features.

A display method provided in embodiments of this application may be applied to an electronic device, for example, a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, a television, or a personal digital assistant (personal digital assistant, PDA). A specific type of the electronic device is not limited in embodiments of this application.

Figure 1:
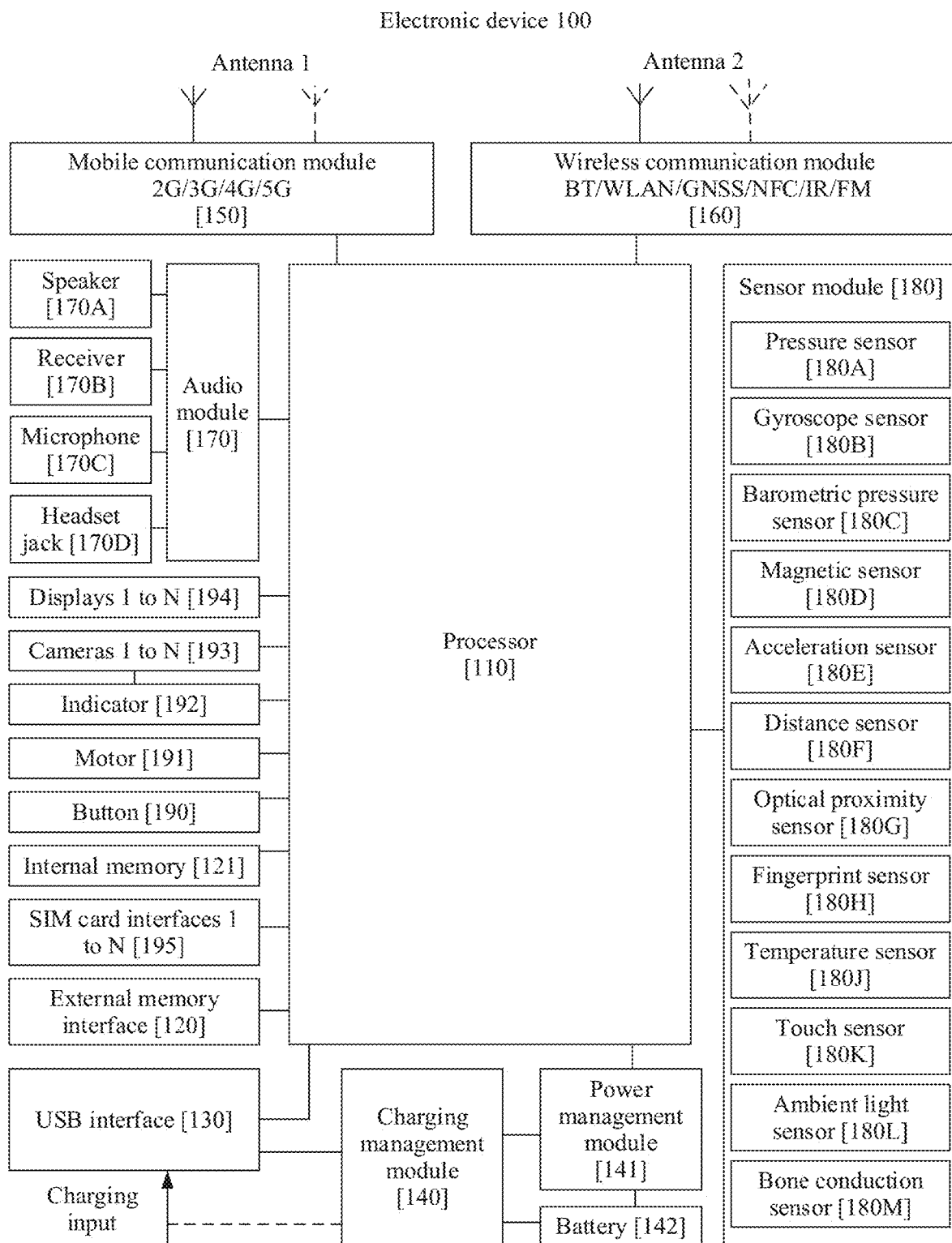
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO)

interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication to sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface. CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device like an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input by using a wireless charging coil of the electronic device 10. The charging management module 140 may supply power to the electronic device through the power management module 141 while charging the battery 142.

The power management module 141 is configured to connect to the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device

100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (wireless local area network, WLAN) (such as, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 1M may include one or N displays 194, where N is a positive integer greater than 1.

The electronic device 100 may implement a photographing function through the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. The NPU can implement applications such as intelligent cognition of the electronic device 100, for example, image recognition, facial recognition, speech recognition, and text understanding.

The external memory interface 120 may be configured to connect to an external storage card, for example, a micro-SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121 to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) created when the electronic device 100 is used, and the like. In addition, the internal memory 121 may include a high speed random access memory, or may include a nonvolatile memory, for example, at least one magnetic disk storage device, a flash memory device, or a universal flash storage (universal flash storage, UFS).

The electronic device 100 may implement audio functions such as music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode by using the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, recognize a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effect for touch operations performed on different areas of the display 194. Different application scenarios (for example, a time reminder, information receiving, an alarm clock, and a game) may alternatively correspond to different vibration feedback effect. Touch vibration feedback effect may be further customized.

The indicator 192 may be an indicator light, and may be configured to indicate a charging state and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
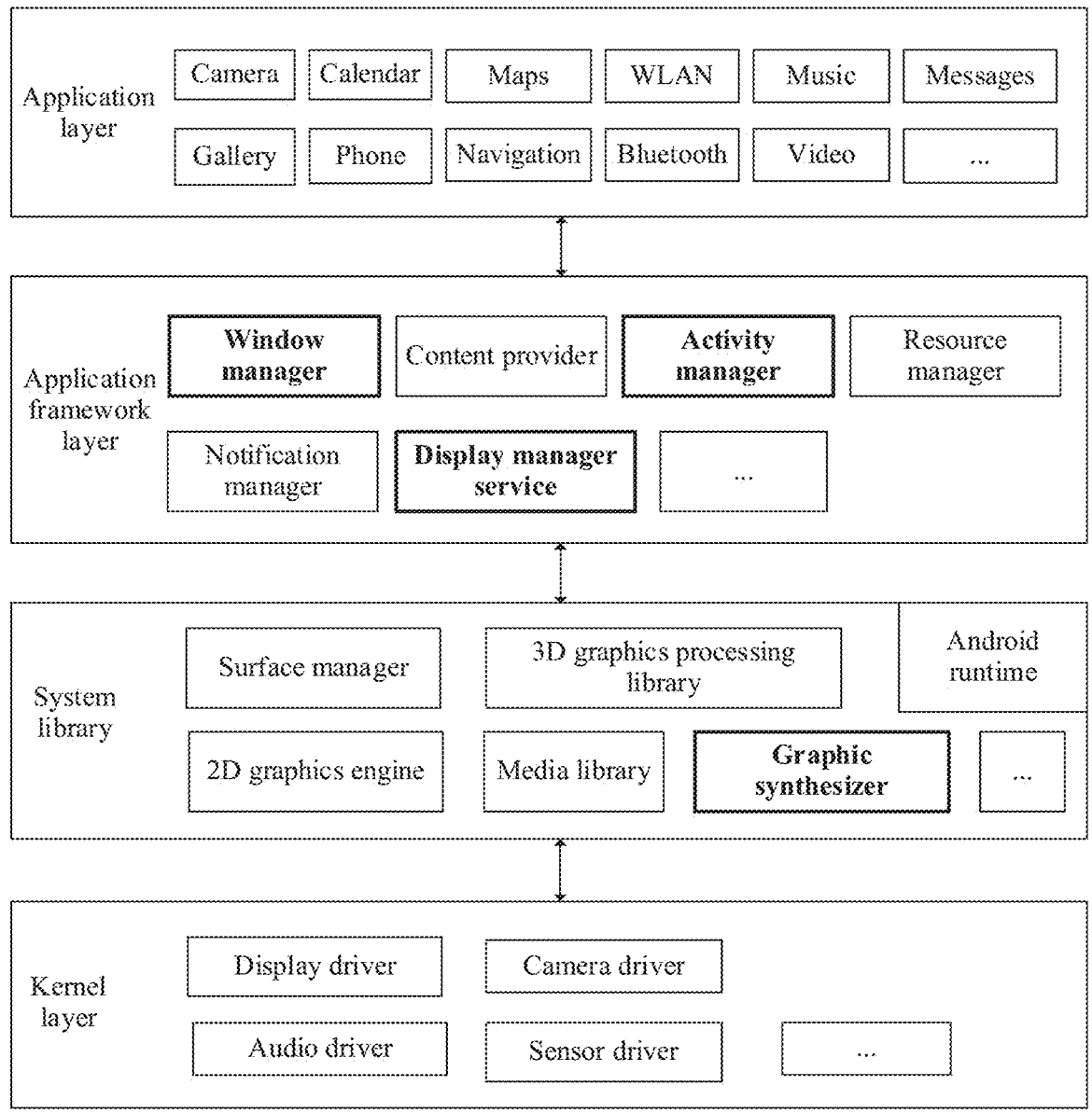
FIG. 2 is a schematic diagram of a software structure of an electronic device according to an embodiment of this application.

FIG. 2 is a block diagram of a software structure of the electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation. WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, an activity manager, a view system, a resource manager, a notification manager, a display management service, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application program. The data may include a video, an image, an audio, calls that are made and received, a browsing history, a bookmark, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The activity manager is configured to manage an Android activity management service, for example, life cycle management of an activity.

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The display management service is configured to: manage a displayed life cycle, determine how to control logical display based on a currently connected physical display device, send notifications to a system and an application when a state changes, and so on.

The Android runtime includes a kernel library and a virtual machine. The Android runtime is responsible for scheduling and management of the Android system.

The kernel library includes two parts: a function that needs to be invoked in Java language, and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media library), a 3D graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

A graphic synthesizer is configured to: receive graphic display data from a plurality of sources, synthesize the data, and send the synthesize data to a display device.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, a display method provided in embodiments of this application is described in detail by using an electronic device having the structures shown in FIG. 1 and FIG. 2 as an example and with reference to the accompanying drawings and application scenarios.

FIG. 3(*a*) to FIG. 3(*e*) are schematic diagram of a group of graphical user interfaces (graphical user interface, GUI) according to an embodiment of this application. A process in which a user starts and uses an application on a tablet is shown in FIG. 3(*a*) to FIG. 3(*e*).

Refer to FIG. 3(*a*). The GUI is a display desktop 310 of the tablet. The display desktop 310 may include application icons of a plurality of applications. The user may open an application by tapping an application icon of the application. After detecting an operation of tapping or holding down an application icon 311 of HUAWEI Music by the user, the tablet may display a GUI shown in FIG. 3(*b*).

Optionally, after detecting an operation of tapping the application icon 311 of HUAWEI Music by the user, the tablet may directly display a GUI shown in FIG. 3(*c*).

Optionally, there is a control in a floating mode on a drop-down interface of the tablet. After the user taps the floating control, the tablet enters a floating mode of starting an application. In the floating mode, an application is started by default in a form of a floating window instead of full screen.

Figure 3A:
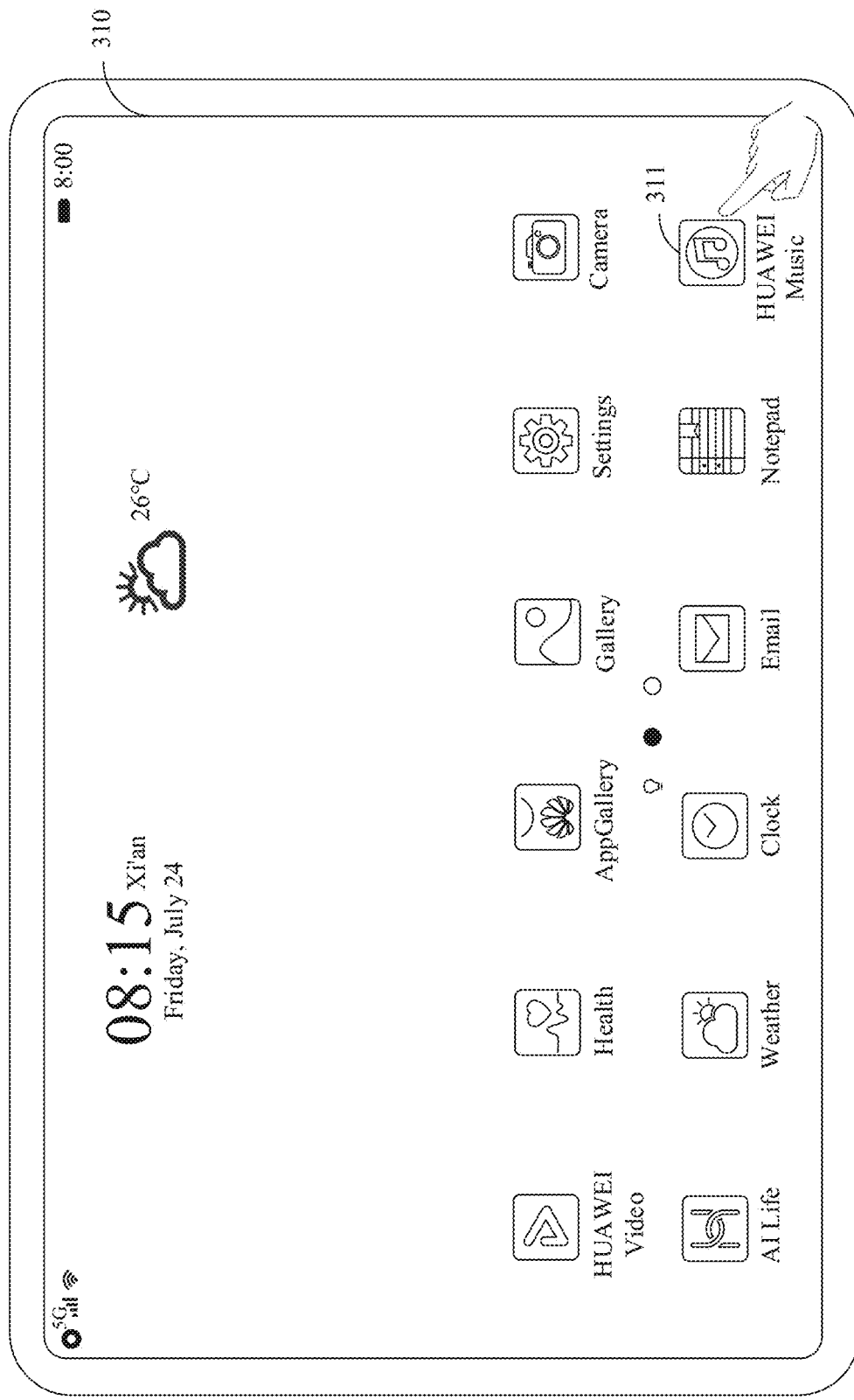
FIG. 3(a) to FIG. 3(e) are schematic diagrams of a group of GUIs according to an embodiment of this application.
Figure 3B:
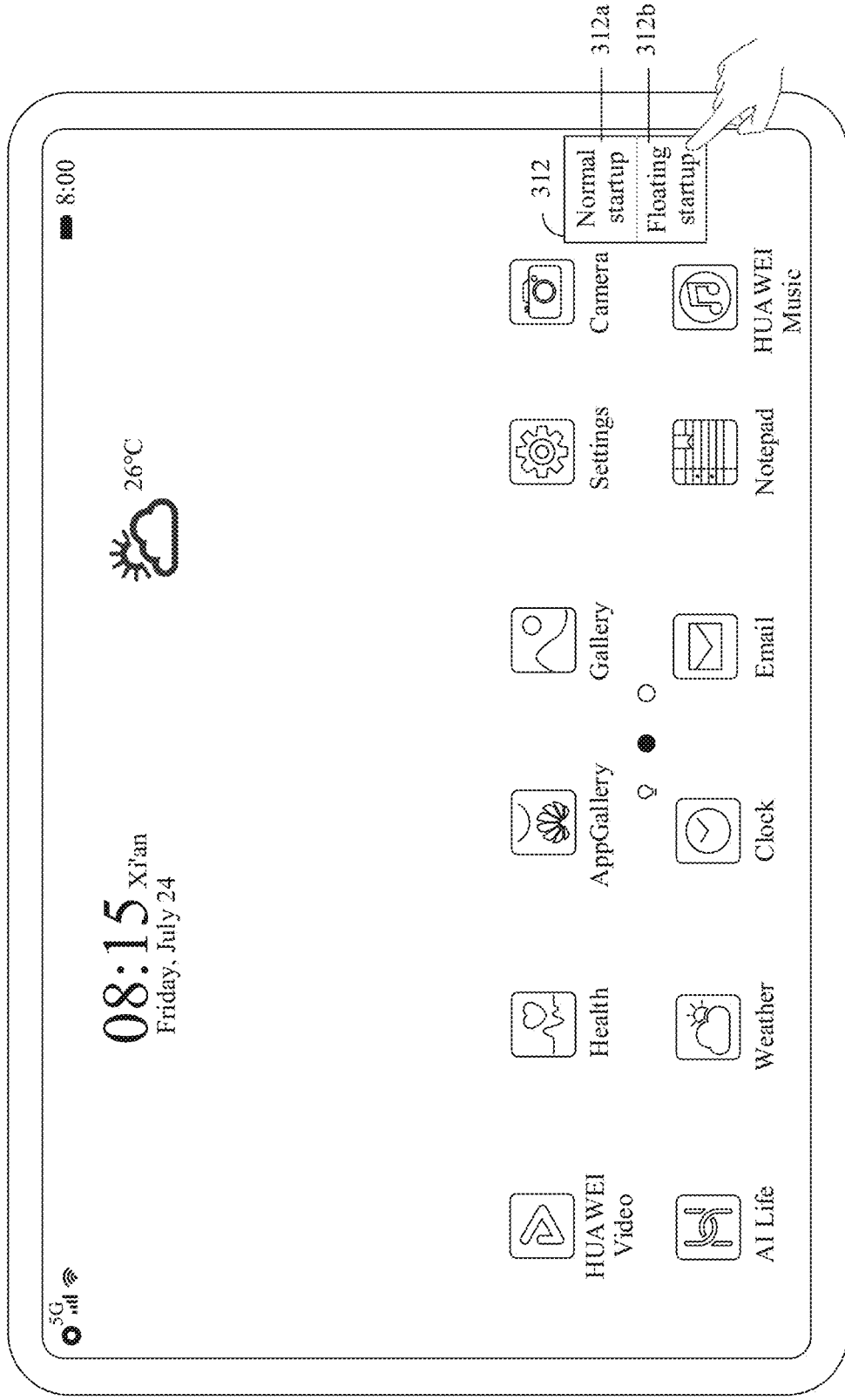

Refer to FIG. 3(b). A selection prompt box 312 appears in the upper right corner of the application icon 311 of HUAWEI Music. The prompt box 312 may include normal startup 312a and floating startup 312b. After detecting an operation of tapping the floating startup 312b by the user, the tablet may display a GUI shown in FIG. 3(c).

It should be understood that, in this embodiment of this application, normal startup indicates that an application is started in full screen, and floating startup indicates that an application is not started in full screen, but is started in the form of a floating window.

In this embodiment of this application, the prompt box 312 may alternatively be located directly above or on the right of the application icon 311 of HUAWEI Music. This is not limited in this embodiment of this application.

Figure 3C:
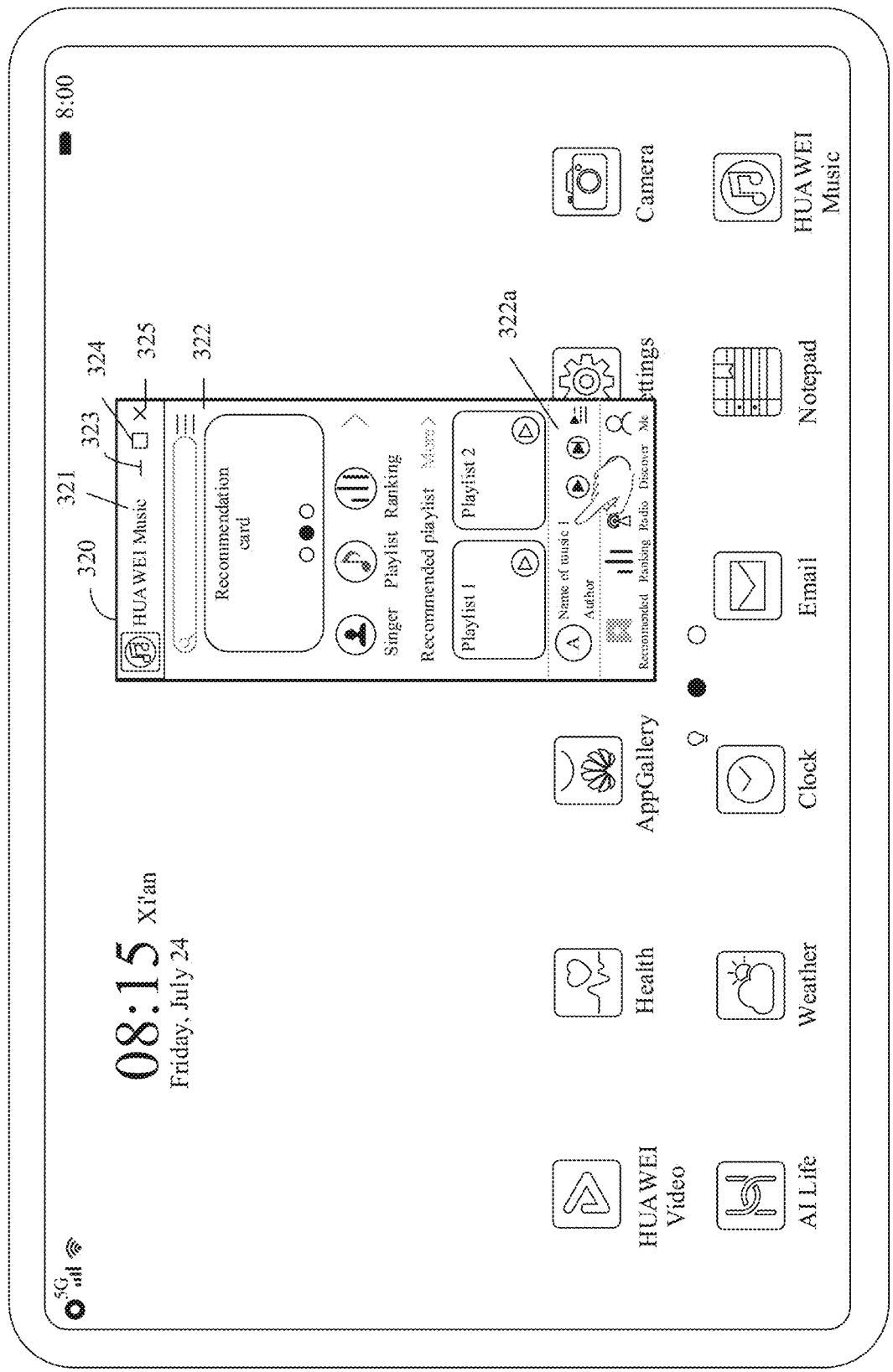

Refer to FIG. 3(c). HUAWEI Music is started in the form of a floating window. An interface 320 is a display interface of a home page of HUAWEI Music. The interface 320 includes a title bar 321 and a content display part 322. The title bar 321 includes the application icon of HUAWEI Music and text "HUAWEI Music". The title bar 321 may further include controls 323, 324, and 325. When the user taps the control 323, HUAWEI Music may be closed. When the user taps the control 324, HUAWEI Music may be maximized for display. When the user taps the control 325, HUAWEI Music may be minimized for display. The content display part 322 is consistent with content displayed on the home page of HUAWEI Music that is started in a normal state. After detecting an operation of tapping an area 322a by the user, the tablet may display a GUI shown in FIG. 3(d).

In a possible implementation, after HUAWEI Music is started in a floating mode, the tablet may determine size information of the display interface 320 of the home page of HUAWEI Music and a display location of the interface 320 on the display desktop 310 of the tablet. For example, the interface 320 is less than or equal to half of the display desktop of the tablet in size, or the interface 320 is equal to one third of the display desktop of the tablet in size, or the like. The interface 320 may be displayed in the middle of a display interface of the tablet, or a first distance between an upper boundary of the interface 320 and an upper boundary of the tablet is equal to a second distance between a lower boundary of the interface 320 and a lower boundary of the tablet, or the first distance is half of the second distance. This is not limited in this embodiment of this application.

Figure 3D:
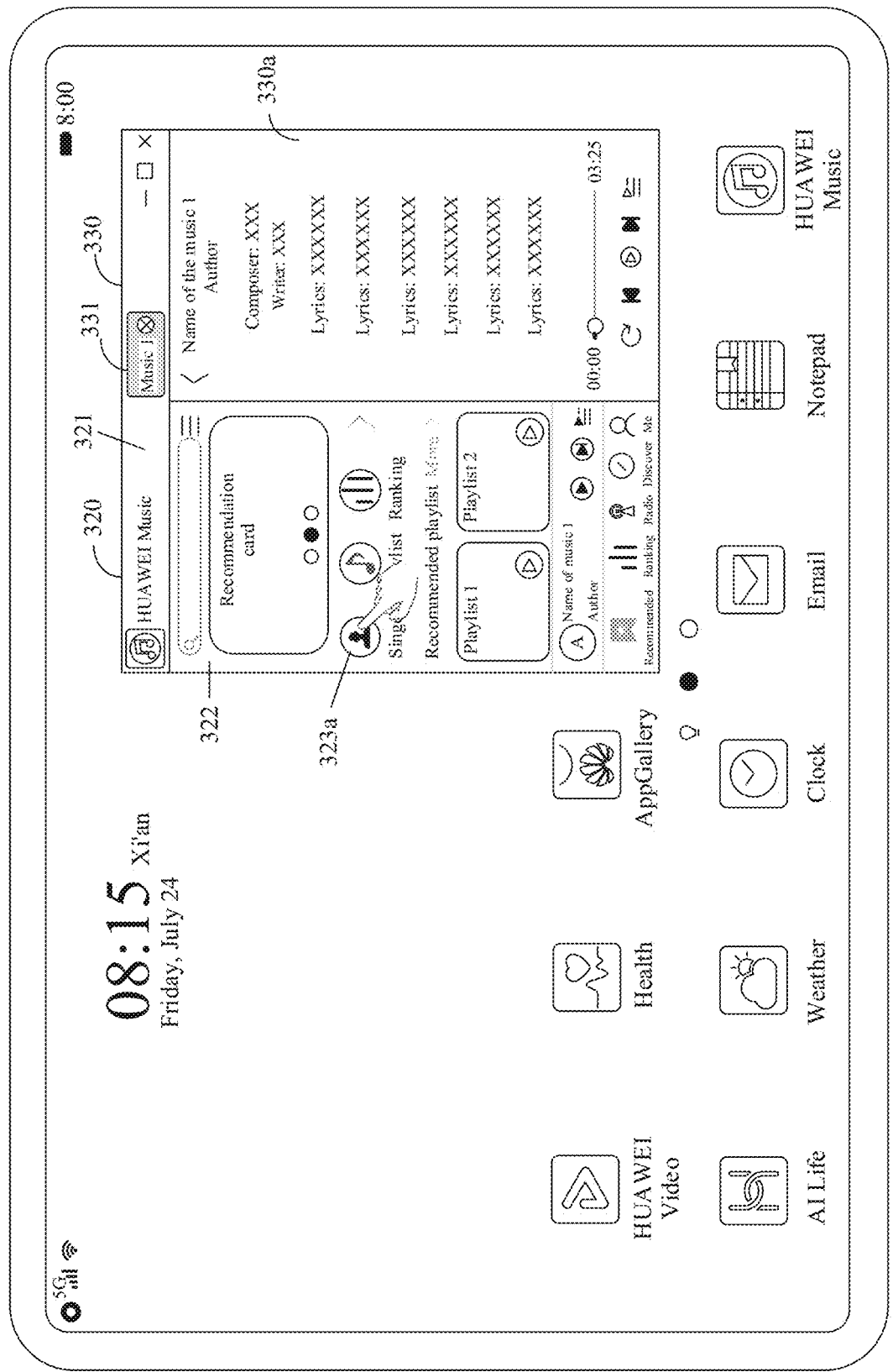

Refer to FIG. 3(d). A display interface 330 of music 1 is displayed on the right of the interface 320 in a form of an extended interface. The interface 330 includes a title bar and a playback interface of the music 1. The title bar includes a subtitle label 331 of the music 1. The subtitle label 331 includes text "music 1" and a control for closing the interface 330. The playback interface of the music 1 may include a name, an author, lyrics, a playback progress bar, a playback control button, and the like of the music 1. By using the playback control button, the user can perform operations such as playing, pausing, switching to the next song, switching to the previous song, switching a playback mode, and viewing a playlist. After detecting an operation of tapping an icon 323a of a singer on the interface 320 by the user, the tablet may display a GUI shown in FIG. 3(e).

In this embodiment of this application, the icon of HUAWEI Music and the text "HUAWEI Music" on the interface 320, the subtitle label 331 of the music 1, and the controls 323, 324, and 325 may all be located in a same title bar.

It should be understood that, in this embodiment of this application, a length and a width of the interface 330 are consistent with that of the interface 320. Alternatively, the interface 330 may be located on the left side of the original interface 320. This is not limited in this embodiment of this application.

Figure 3E:
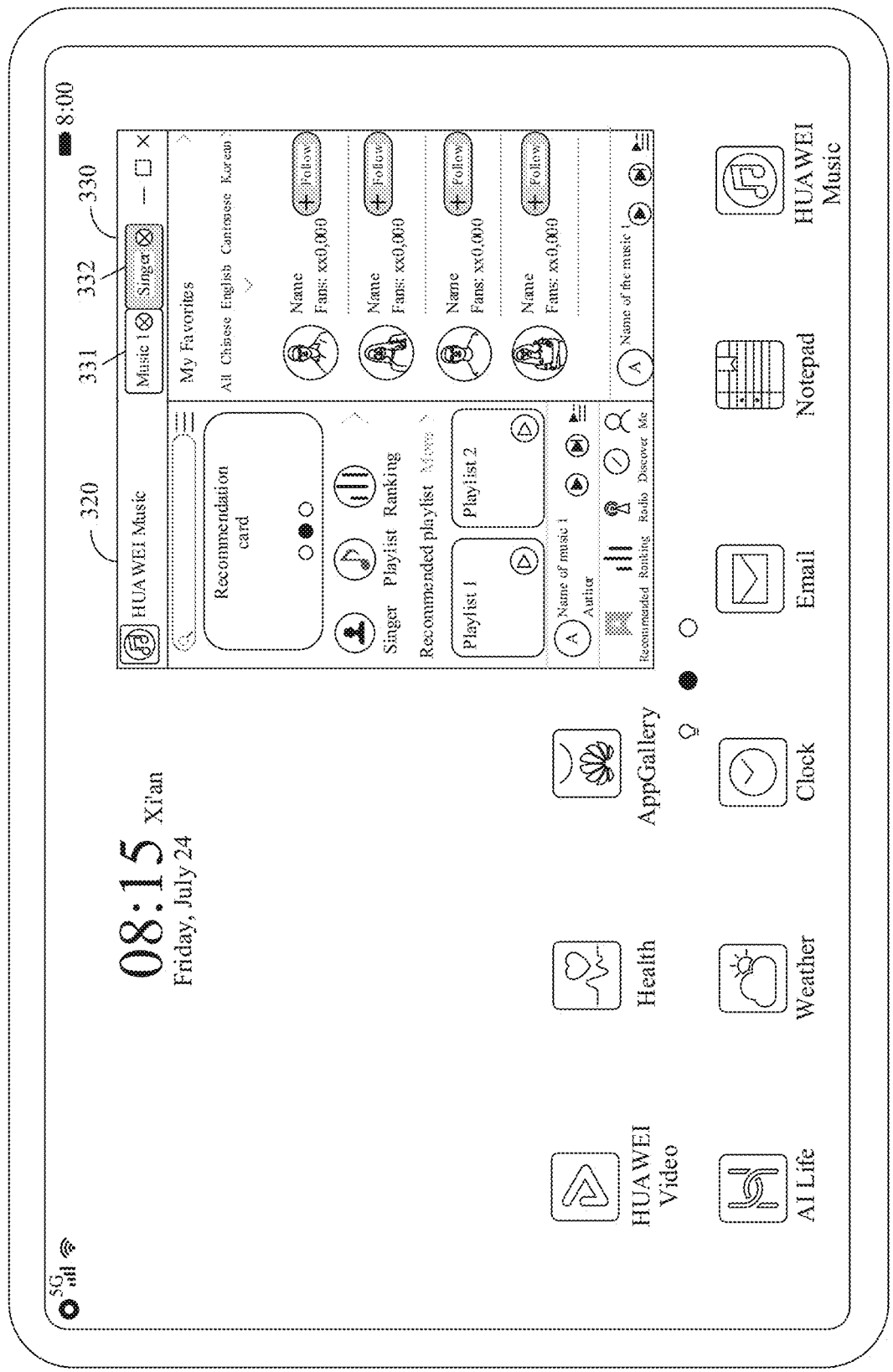

Refer to FIG. 3(e). A subtitle label 332 of the singer is displayed in a title bar on the interface 330, and the subtitle label 332 further includes a control for closing the subtitle label 332. Content displayed in a content display part of the interface 330 is consistent with content displayed when the singer is tapped in a normal state. The subtitle label 332 is in a selected state, indicating that content of the subtitle label 332 is currently displayed on the interface.

In this embodiment of this application, the user may implement interface switching by tapping the subtitle labels 331 and 332 in the title bar. For example, a content display part corresponding to the subtitle label 332 is currently displayed on the interface 330. When the user taps the subtitle label 331, a content display part corresponding to the subtitle label 331 may be switched to the foreground for display, and the subtitle label 331 changes to a selected state. In addition, the content display part corresponding to the subtitle label 332 is switched to the background and is invisible to the user.

It should be understood that, in this embodiment of this application, an example in which an extended interface includes two sublabels and page content of the two sublabels is used for description. In actual use, a quantity of sublabels is not limited.

According to this embodiment of this application, when the user starts an application in a floating mode, the application is displayed on a desktop of the electronic device in the form of a floating window, and an icon and a title of a title bar application are added on an original interface and displayed in a title bar. When the user taps a control or an area on a home page of the application, a new pop-up interface does not cover the original interface, but is displayed on the right of the original interface in the form of an extended interface, and a title of the extended interface is displayed in the title bar. According to the technical solution, a plurality of windows can be displayed in the application, so that when browsing the original interface, the user can view content on a plurality of new opened interfaces, and can tap to switch between the content on the plurality of interfaces. This improves user experience.

FIG. 4(a) to FIG. 4(d) are schematic diagrams of another group of GUIs according to an embodiment of this application. A process in which a user starts and uses an application on a tablet is shown in FIG. 4(a) to FIG. 4(d). In this embodiment of this application, the tablet may enter a computer mode. For example, the tablet may enter the computer mode, if it is detected that an external keyboard or a mouse is connected to the tablet, or a virtual keyboard is detected. Alternatively, the tablet may enter the computer mode through manual setting by the user.

Figure 4A:
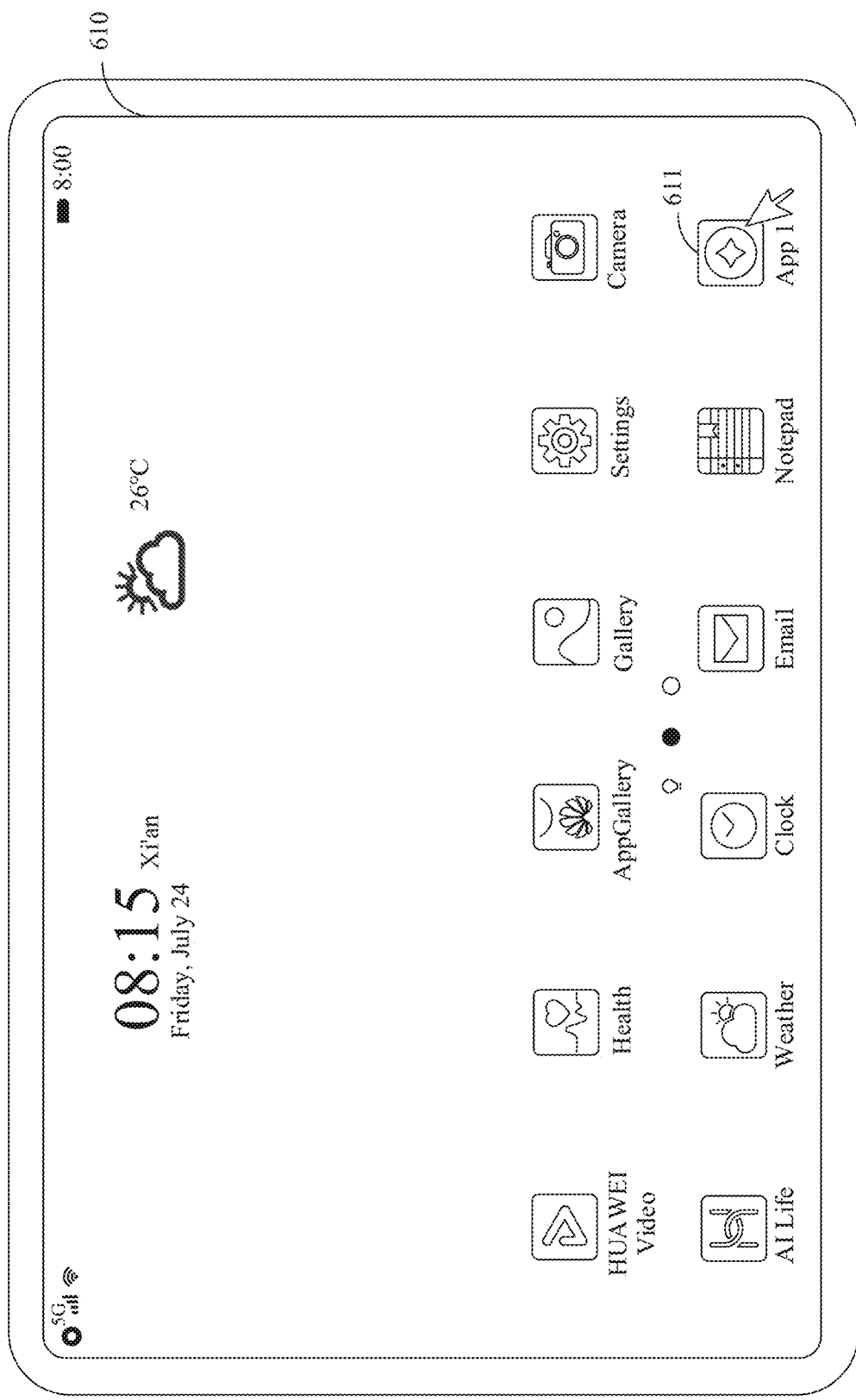
FIG. 4(a) to FIG. 4(d) are schematic diagrams of another group of GUIs according to an embodiment of this application.

Refer to FIG. 4(a). The GUI may be considered as a display desktop 610 of the tablet. The display desktop 610 may include application icons of a plurality of applications. The user may click an application icon of an application by using the mouse to open the application. After detecting a click or double click on an application icon of an App 1, the tablet may display a GUI shown in FIG. 4(b).

Figure 4B:
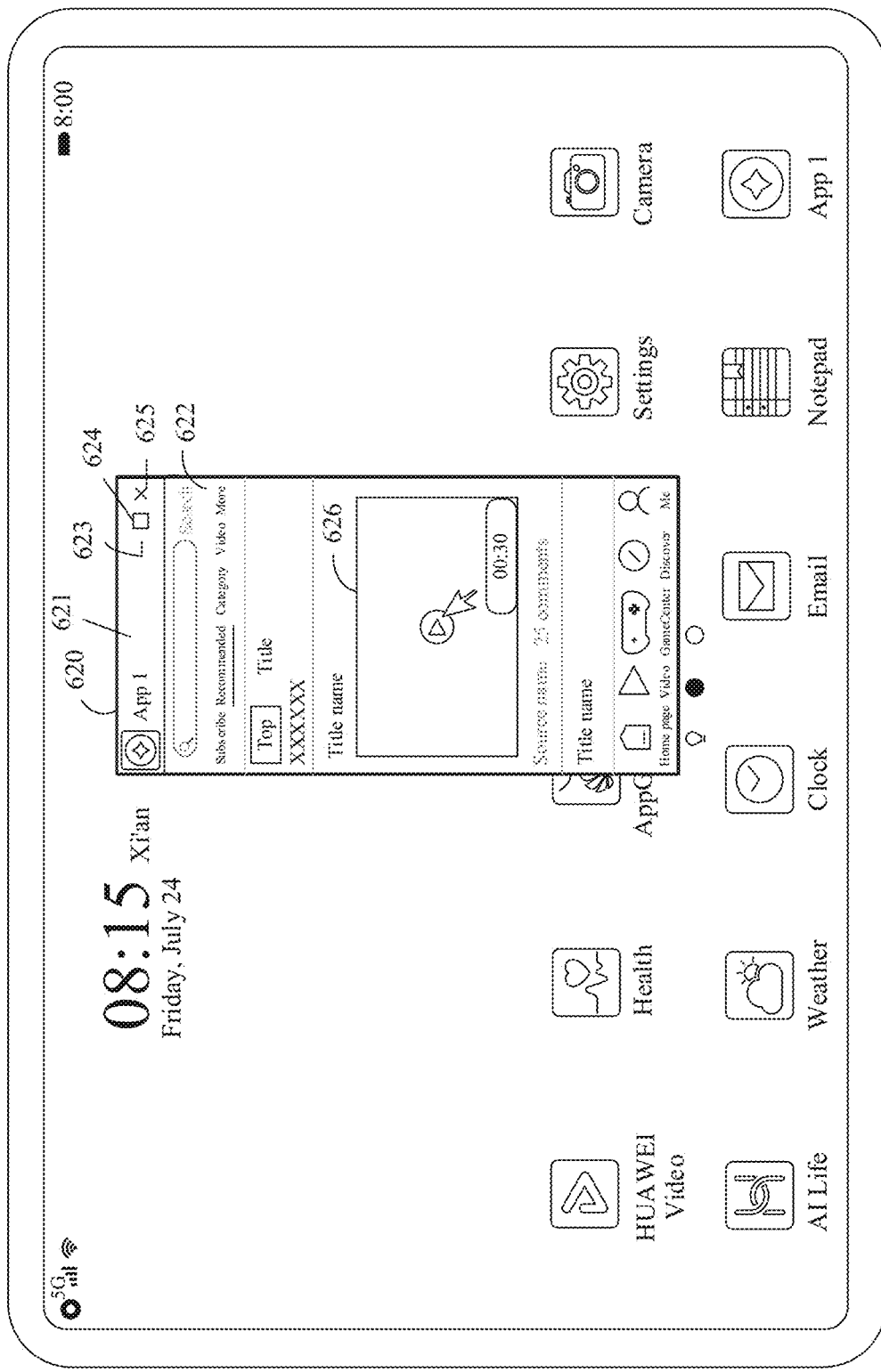

Refer to FIG. 4(b). The GUI is a display interface 620 of a home page of the App 1. The display interface 620 is suspended on the display desktop 610 of the tablet, and the display interface 620 may include a title bar 621 and a content display part 622. The title bar 621 may include the application icon, an application name, and controls 623, 624, and 625 of the App 1. When the user taps the control 623, the display interface 620 may be minimized for display. When the user taps the control 624, the display interface 620 may be maximized for display. When the user taps the control 625, the App 1 may be closed.

The App 1 may be a news App. The content display part 622 may include a plurality of pieces of news information. After detecting an operation of clicking a video card 626 by the user by using the mouse, the tablet may display a GUI shown in FIG. 4(c).

Figure 4C:
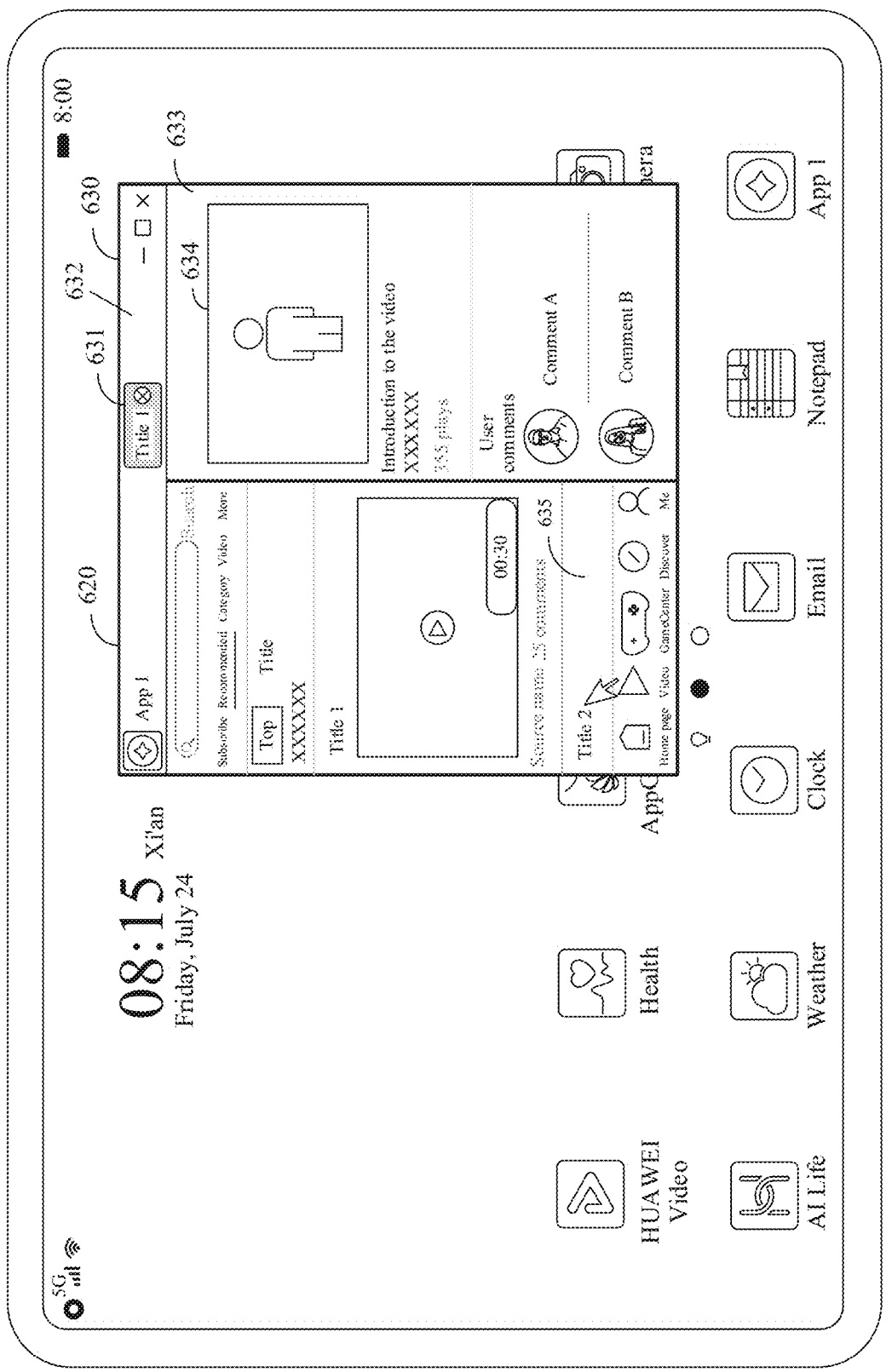

Refer to FIG. 4(c). The tablet continues to display the display interface 620, and a playback interface 630 of the video card 626 is displayed on the right side of the display interface 620 in a form of an extended interface. The playback interface 630 may include a title bar 632 and a content display part 633. The title display area 632 may include a subtitle label 631, and the subtitle label 631 may include text "title 1" and a control for closing the playback interface 630. The content display part 633 may include a video card 634, an introduction to the video, a quantity of playing times, a user comment, and the like, and the video card 634 is being played. After detecting an operation of clicking an area 635 by using the mouse, the tablet may display a GUI shown in FIG. 4(d).

In this embodiment of this application, that the user clicks the application icon of the App 1 by using the mouse to open the App 1 may be understood as that the App 1 starts a primary activity 0. A display interface corresponding to the activity 0 is the display interface 620. Detecting the operation of clicking the video card 626 by using the mouse may be understood as that the App 1 starts an activity 1. A display interface corresponding to the activity 1 is the display interface 630.

When the user continues to slide down the mouse on the display interface 620 to browse more news, the video card 634 on the display interface 630 continues to play, and does not pause. Alternatively, when the user clicks controls such as "Discovery" and "Me" on the interface 620 by using the mouse, the content display part of the display interface 620 may change. However, because these controls are not a new activity, the display interface 630 does not change. Instead, the video card 634 continues to be played.

In some examples, the title bar 621 and the title bar 632 may be a same title bar. For example, in response to the operation of clicking the video card 626 by the user, the title bar 621 is double-extended to the right, and the subtitle label 631 is added to the title bar 621. Alternatively, the title bar 621 and the title bar 632 may be two title bars.

In some examples, the playback interface 630 may alternatively be located on the left side of the display interface 620. This is not limited in this embodiment of this application.

In a possible implementation, a width of the interface 630 is adjustable, or a sum of a width of the interface 620 and the width of the interface 630 remains unchanged, but widths of the interface 620 and the interface 630 are adjustable.

Figure 4D:
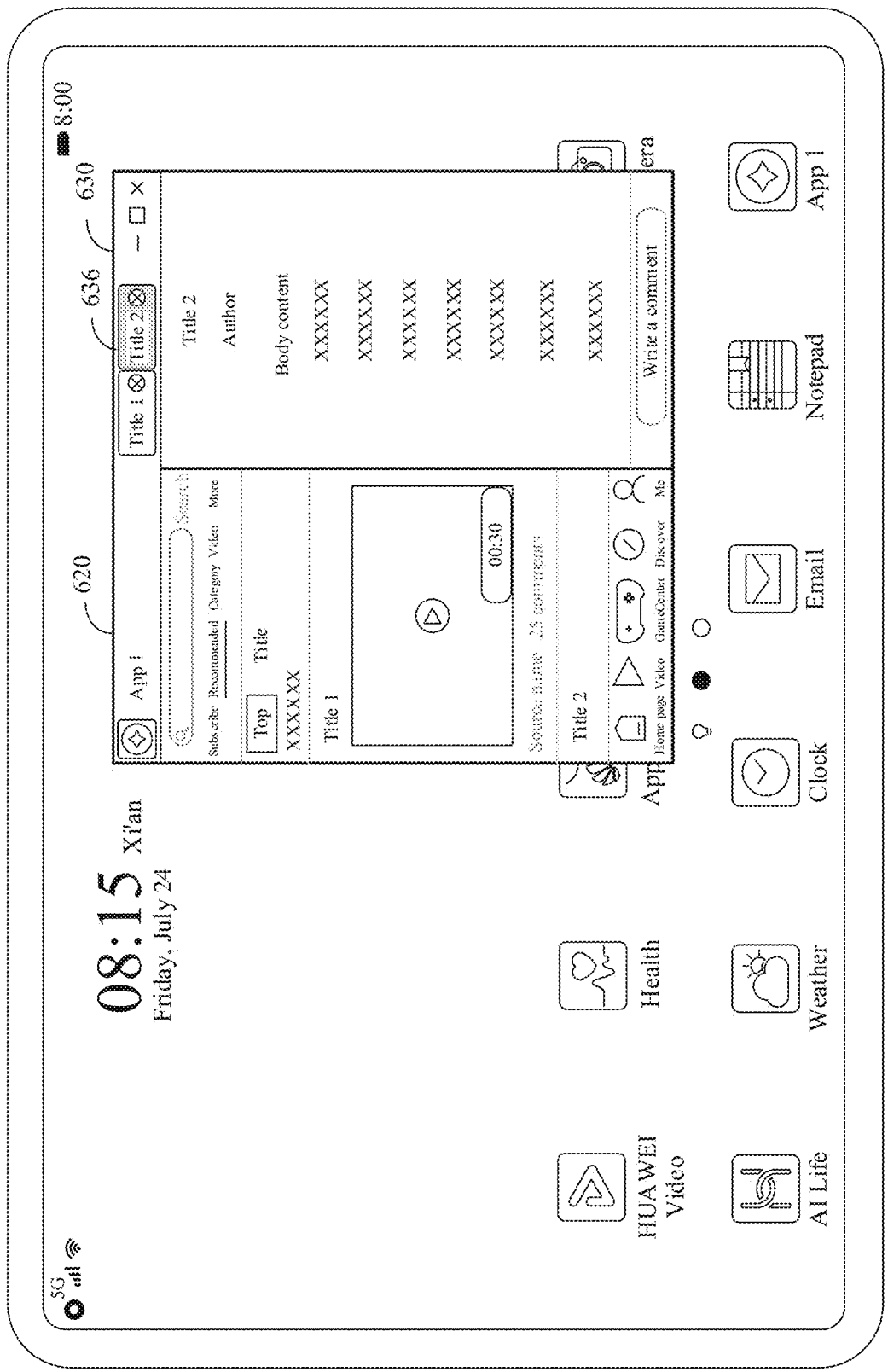

Refer to FIG. 4(d). The tablet continues to display the display interface 620. A content display part 637 of a title 2 covers the content display part 633, and the subtitle label 631 and a subtitle label 636 are displayed in the title bar 632. In addition, the subtitle label 636 is in a selected state, and the subtitle label 636 includes text "title 2" and a control for closing the content display part 637 and the subtitle label 636. The user may click the subtitle label 631 by using the mouse, to display the display interface 633 corresponding to the subtitle label 631.

In some examples, text in the subtitle labels 631 and 636 may be a label 1, a label 2, and the like that are generated in sequence and have an identification function.

In some examples, text in the subtitle labels 631 and 632 may alternatively be a title name of a corresponding activity. For example, the title 1 is a title name of the activity 1, and the title 2 is a title name of the activity 2.

In some examples, text in the subtitle labels 631 and 632 may alternatively be obtained from the tablet by clicking the text by the mouse, or by clicking text associated with a control by the mouse, or by clicking text around a control by the mouse.

According to the technical solution provided in this application, after the electronic device such as the tablet enters the computer mode, an application may be started in a multi-window floating mode, that is, a newly opened interface is displayed on the right of a home page of the application, but does not cover an original interface. According to the technical solution, a plurality of windows can be displayed in the application, so that when browsing an original interface, the user can view content on a plurality of new opened interfaces, and can tap to switch between the content on the plurality of interfaces. This improves user experience.

Figures 1, 5A:
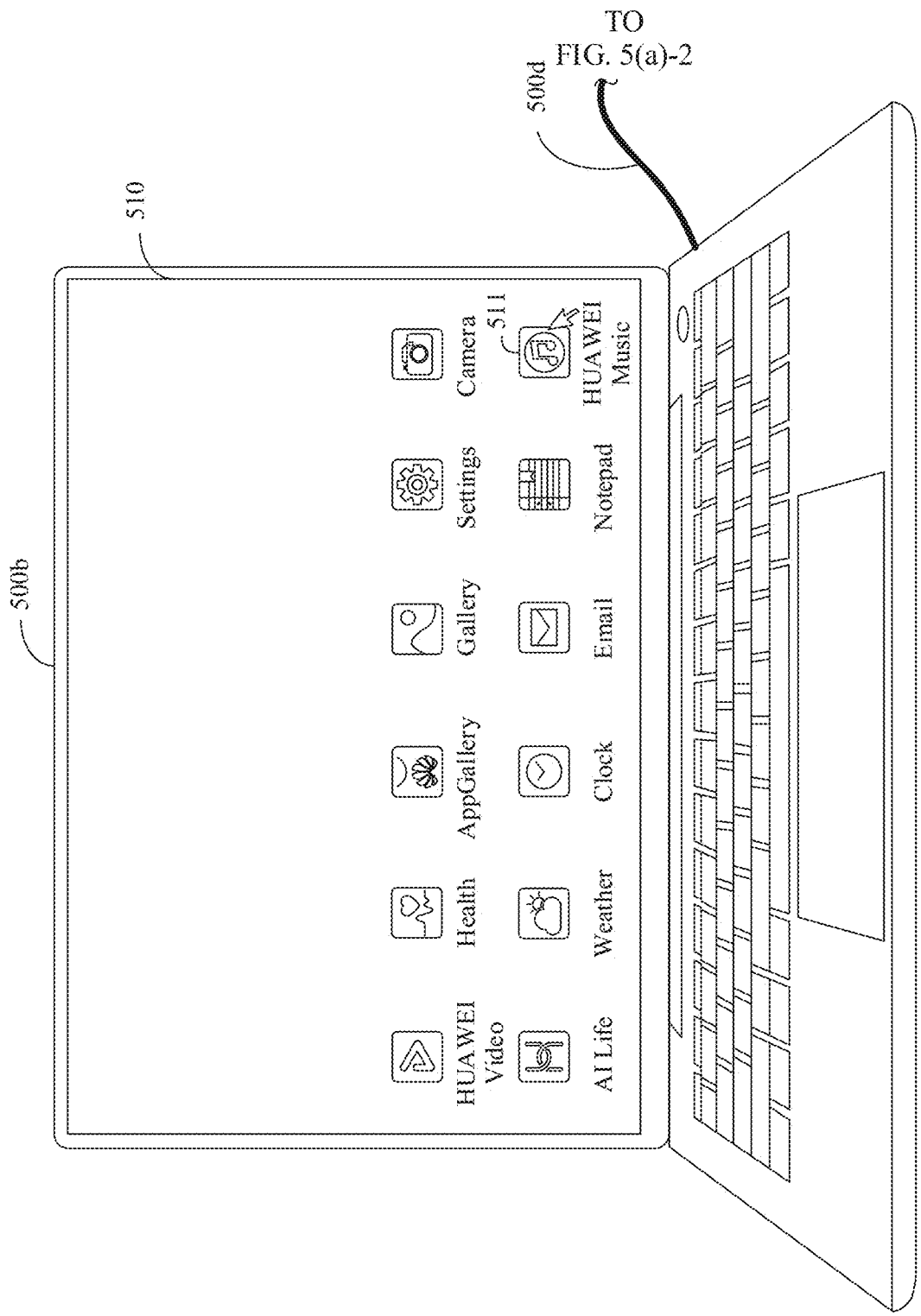
Figures 1, 2, 5A:
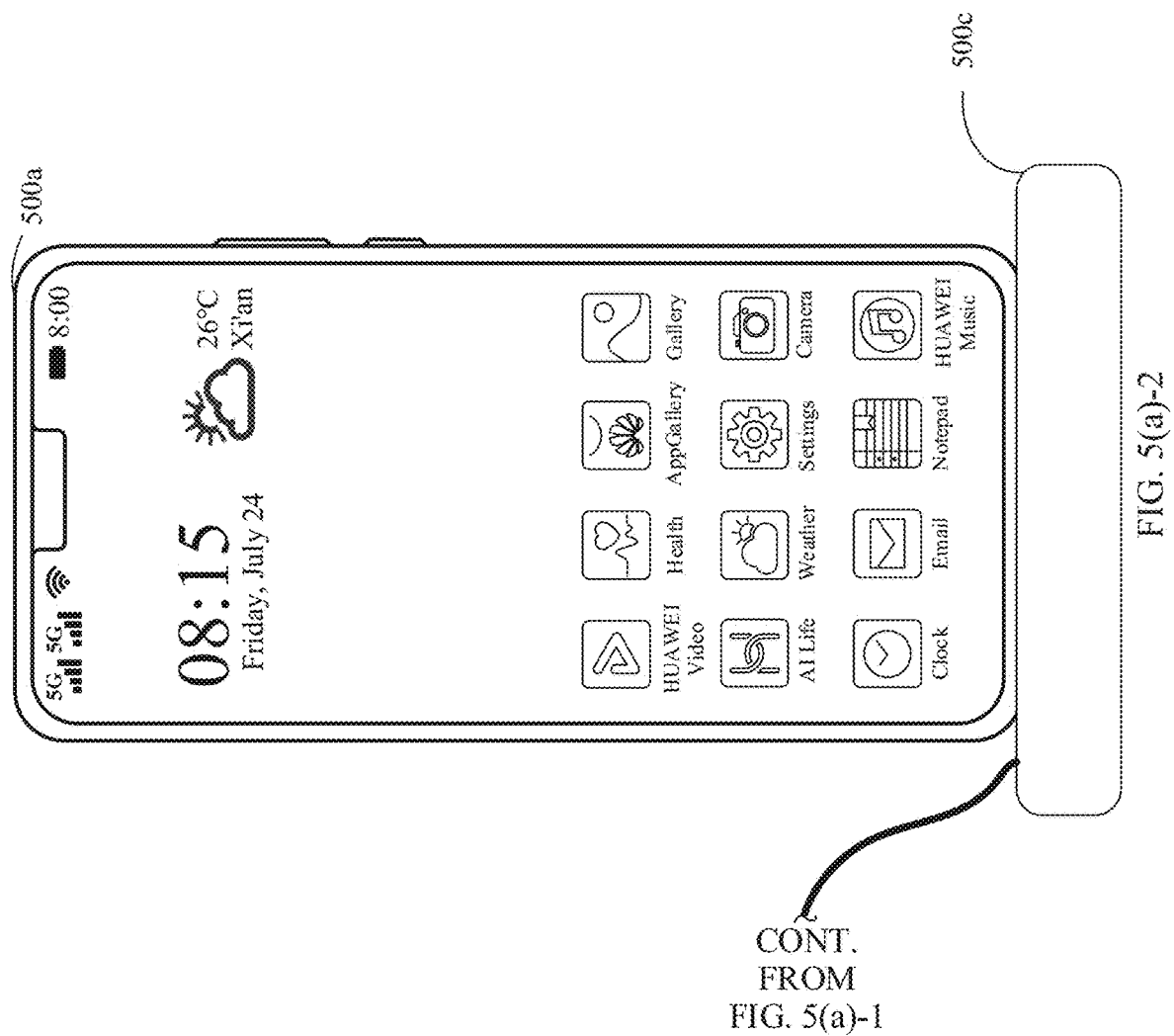
Figure 5B:
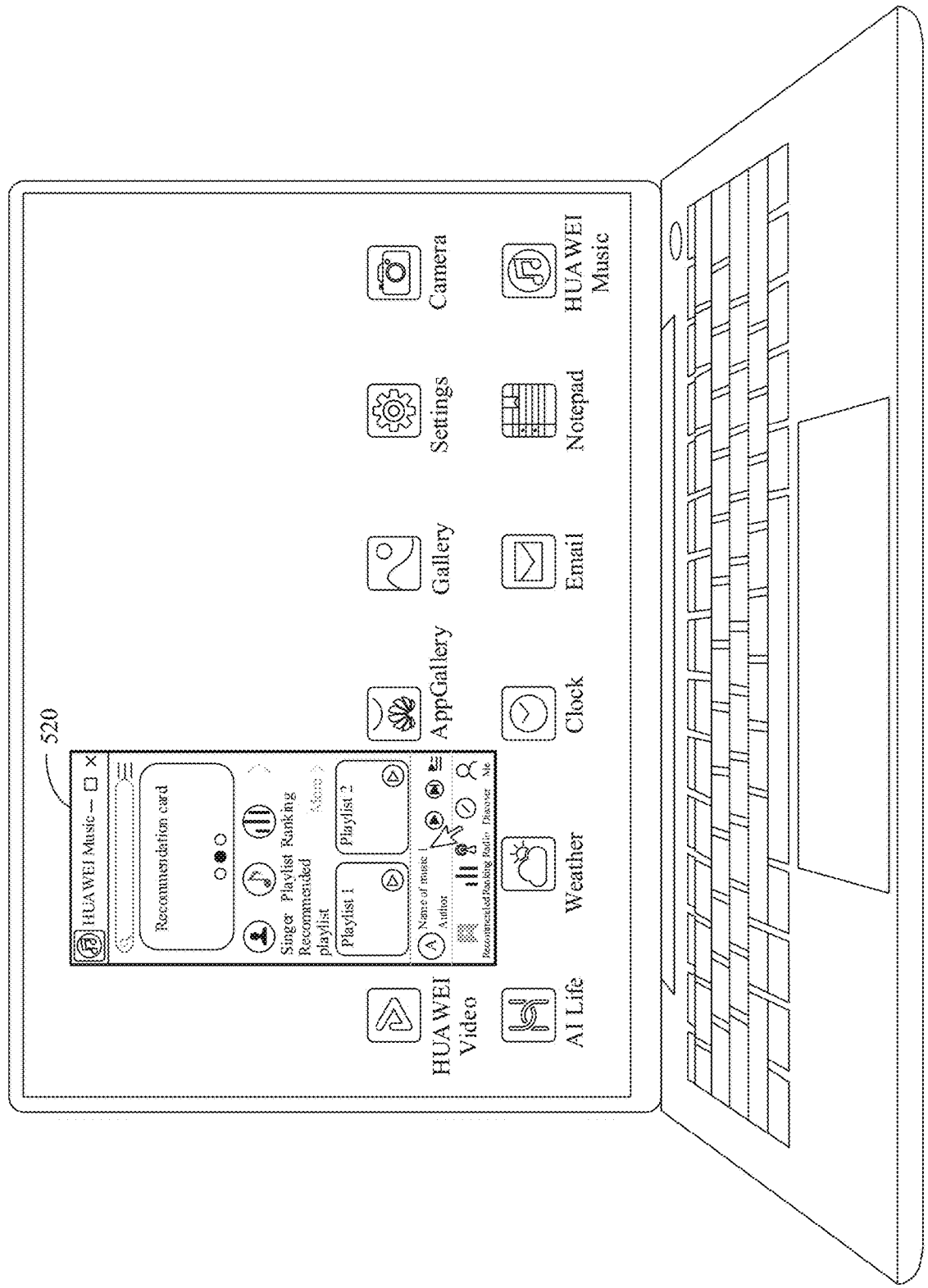
Figure 5C:
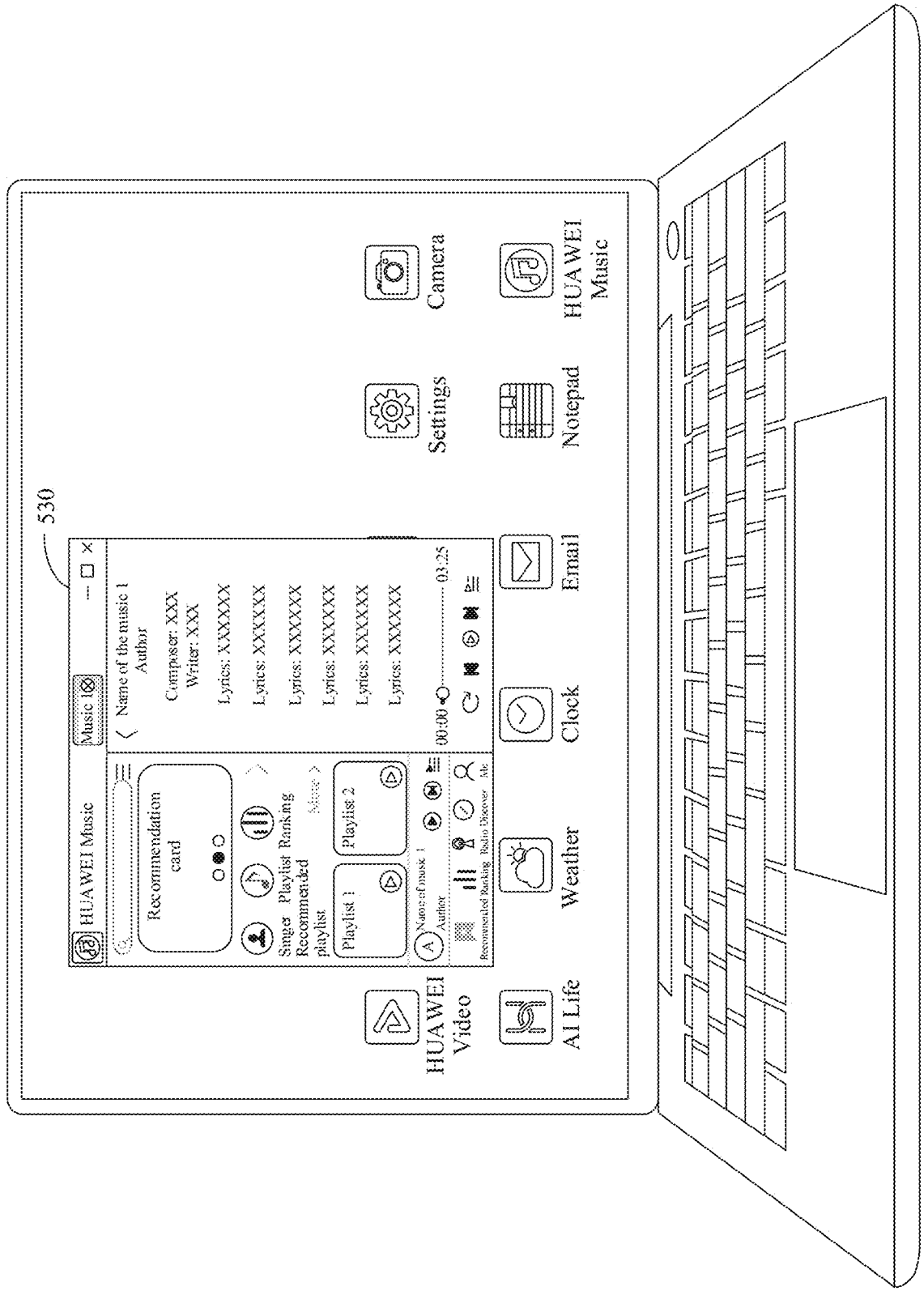

FIG. 5(a)-1 to FIG. 5(c) are schematic diagrams of another group of GUIs according to an embodiment of this application. A process in which a user starts an application on a notebook computer 500b when a mobile phone 500a establishes a projection relationship with the notebook computer 500b is shown in FIG. 5(a)-1 to FIG. 5(c).

Refer to FIG. 5(a)-1 and FIG. 5(a)-2. A display desktop of the mobile phone 500a includes a plurality of applications. The mobile phone 500a establishes the projection relationship with the notebook computer by using a docking station 500c and a data cable 500d. The mobile phone 500a may enable a computer mode, so that a display interface of the notebook computer and a picture of the mobile phone may not interfere with each other. The display interface 510 of the notebook computer 500b includes a plurality of applications installed on the mobile phone. After detecting an operation of double-clicking an application icon 511 of HUAWEI Music by the user, the notebook computer 500b may display a GUI as shown in FIG. 5(b).

It should be understood that the mobile phone may further establish a projection relationship with another large-screen device, for example, a smart screen or a tablet.

In this embodiment of this application, the mobile phone may further establish a projection relationship with the notebook computer or the another large-screen device in a wireless projection manner. This is not limited in this embodiment of this application.

Refer to FIG. 5(b). For a display interface 520 of HUAWEI Music, refer to related descriptions in FIG. 3(c). For brevity, details are not described again.

Refer to FIG. 5(c). For display interfaces 520 and 530 of HUAWEI Music, refer to related descriptions in FIG. 3(d). For brevity, details are not described again.

According to this embodiment of this application, when the mobile phone establishes the projection relationship with the another large-screen device, and the mobile phone enables the computer mode, a display interface of the mobile phone may be different from that of the large-screen device.

When the user opens an application, a home page interface of the application is suspended on a desktop of the large-screen device. When the user clicks an element in the home page, a new pop-up interface is displayed on the right of an original interface in a form of an extended interface, and a title of the extended interface is displayed in a title bar. According to the technical solution, a plurality of windows can be displayed in the application, so that when browsing an original interface, the user can view content on a plurality of new opened interfaces, and the plurality of interfaces are neat and beautiful. This improves visual effect of the application and improves user experience.

FIG. 6(a) to FIG. 6(f) are schematic diagrams of another group of GUIs according to an embodiment of this application. A process in which a user starts a plurality of applications on a tablet is shown in FIG. 6(a) to FIG. 6(f).

Figure 6A:
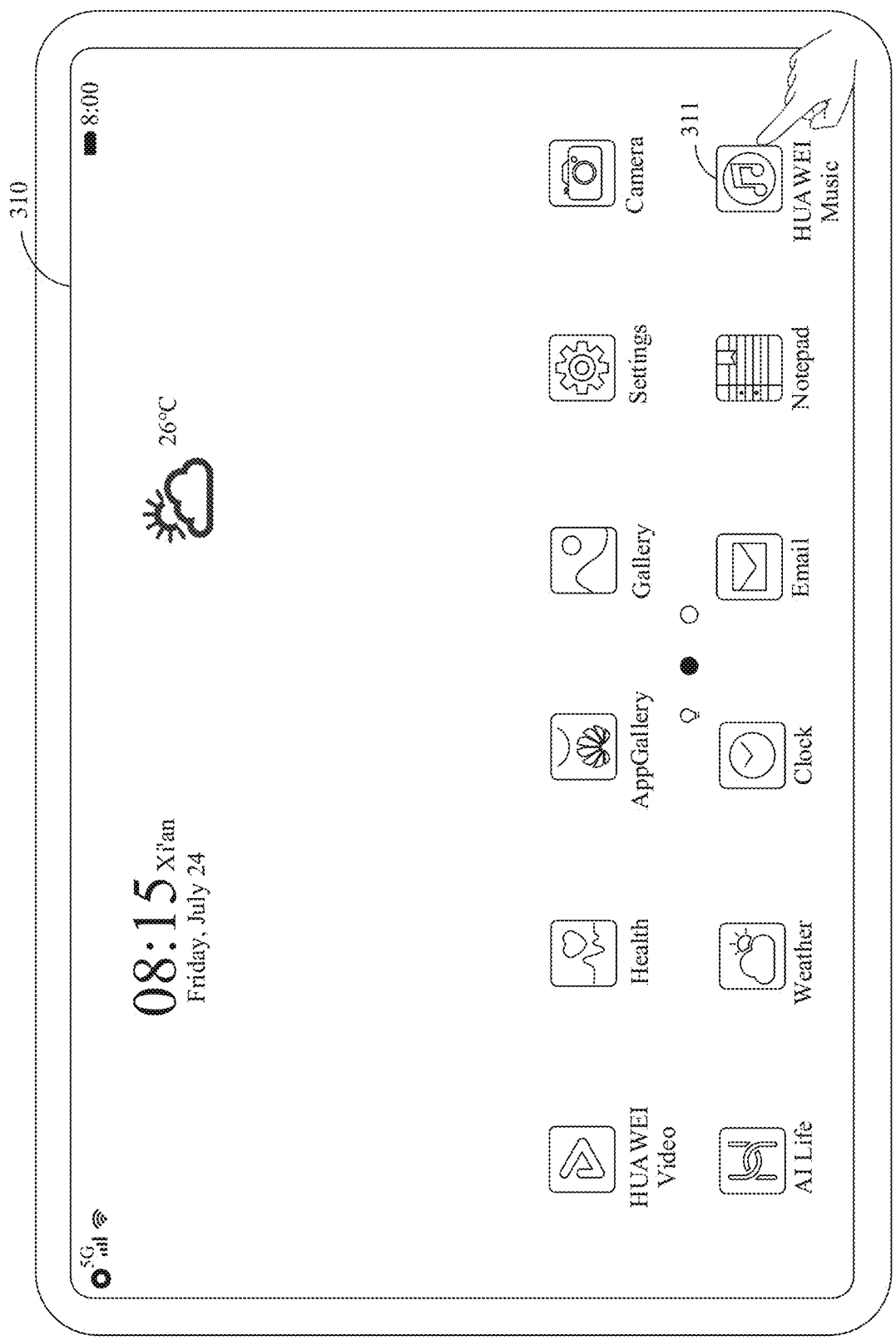
FIG. 6(a) to FIG. 6(f) are schematic diagrams of another group of GUIs according to an embodiment of this application.
Figure 6B:
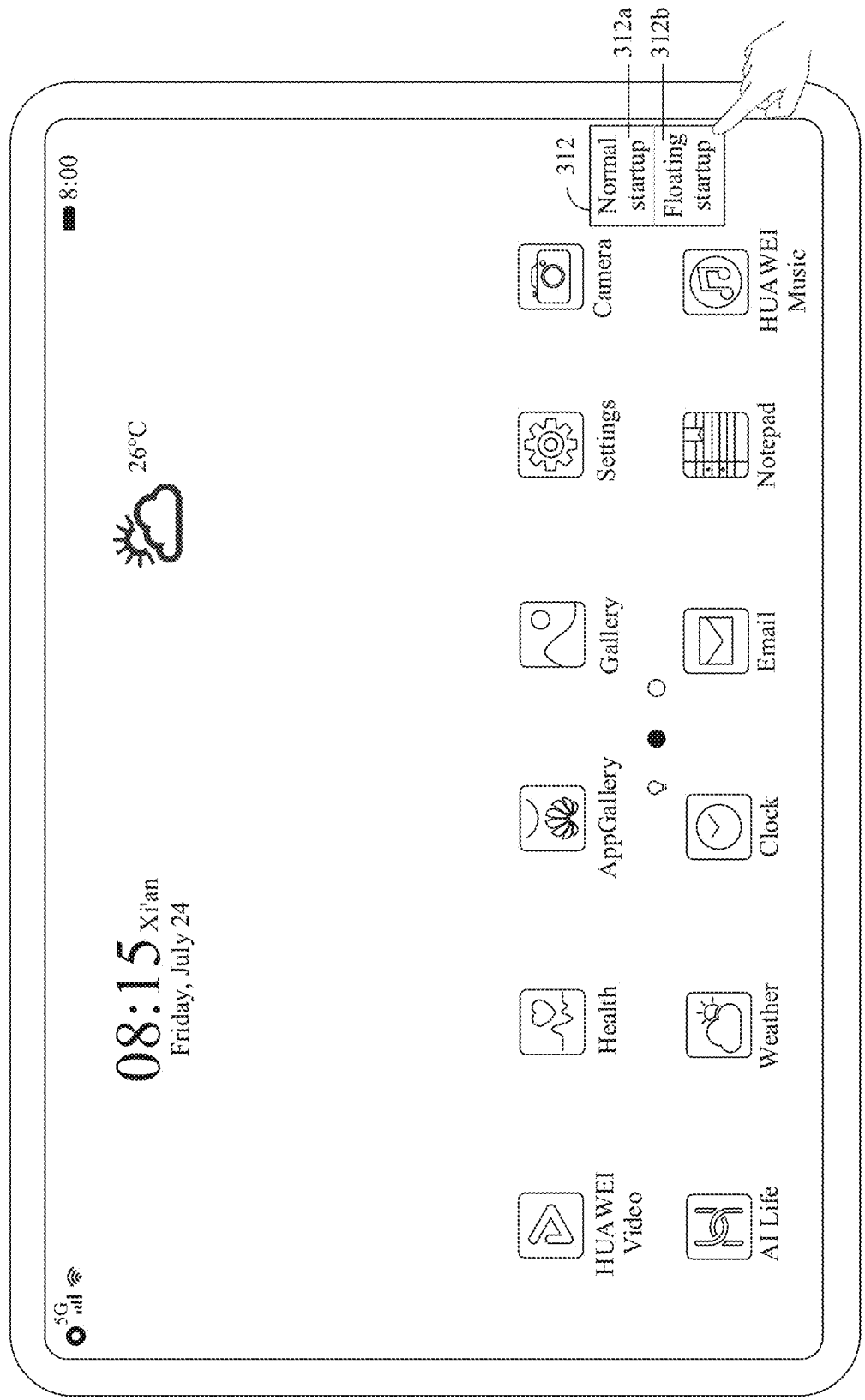
Figure 6C:
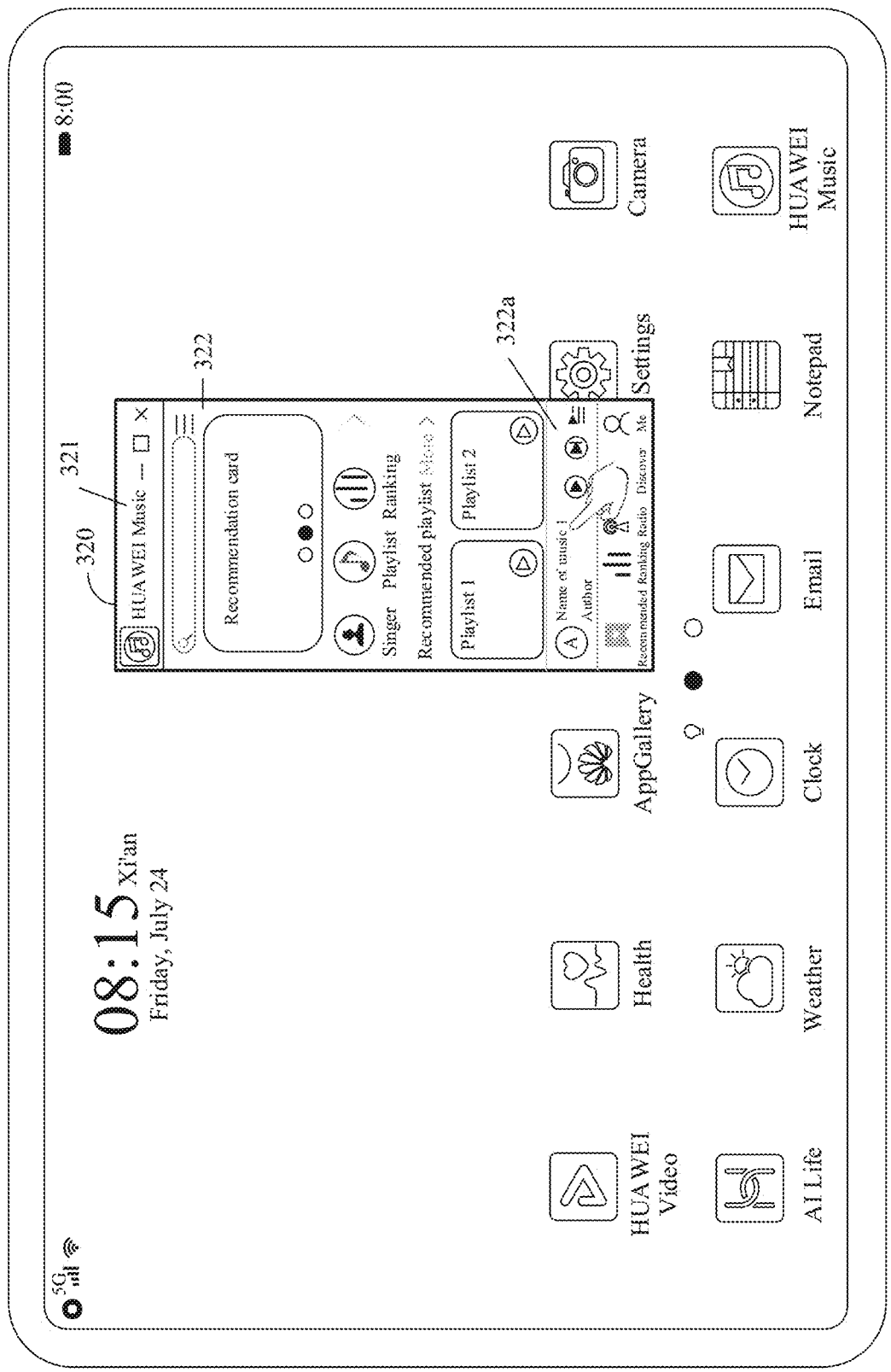

For FIG. 6(a) to FIG. 6(c), refer to related descriptions of FIG. 3(a) to FIG. 3(c). For brevity, details are not described again.

Figure 6D:
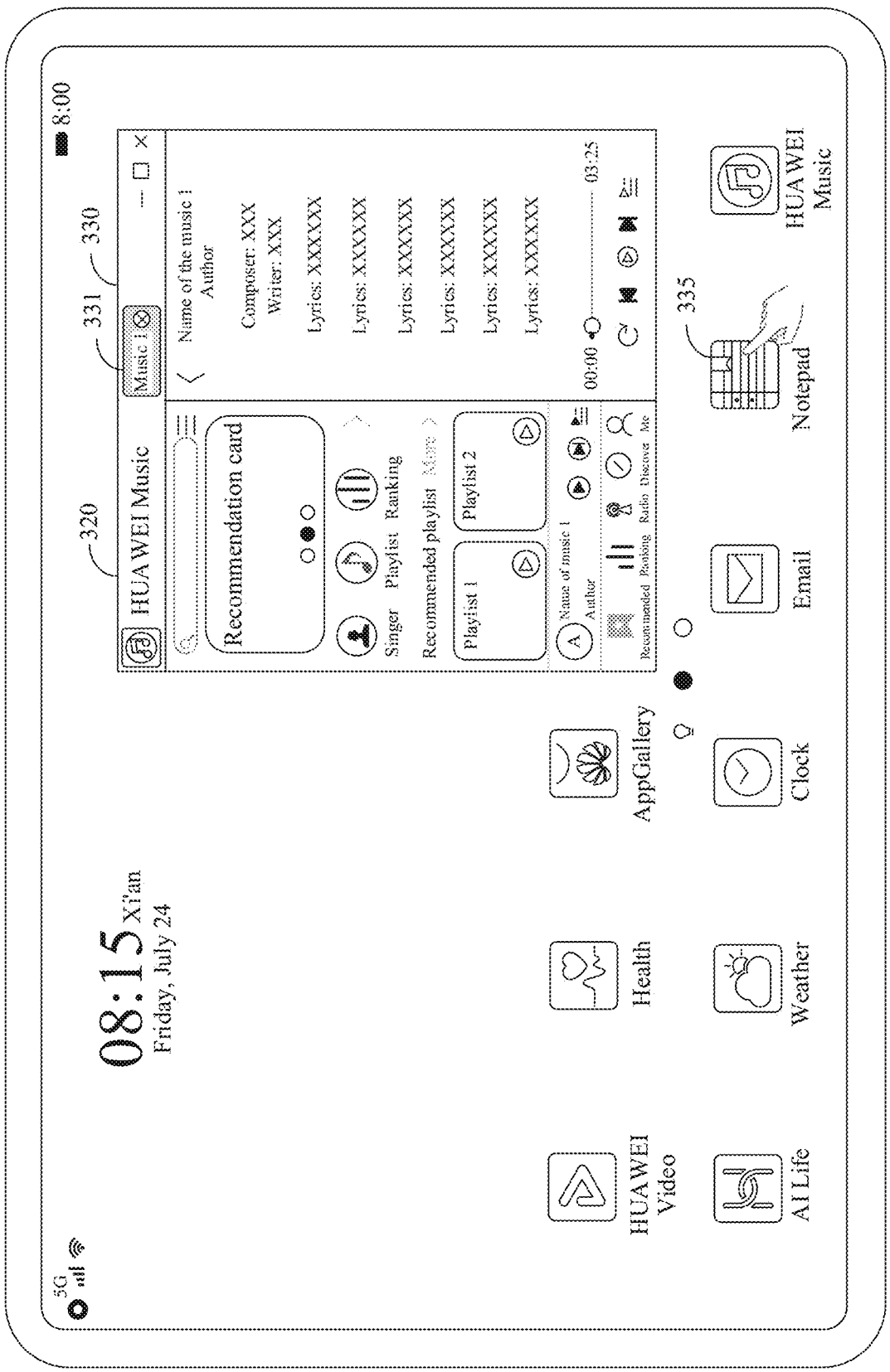

Refer to FIG. 6(d). The display interface 330 of the music 1 is displayed on the right of the interface 320 in a form of an extended interface. The interface 330 includes the title bar and the playback interface of the music 1. The title bar includes the subtitle label 331 of the music 1. The subtitle label 331 includes the text "music 1" and the control for closing the interface 330. The playback interface of the music player may include the name, the author, the lyrics, the playback progress bar, the playback control button, and the like of the music 1. By using the playback control button, the user can perform operations such as playing, pausing, switching to the next song, switching to the previous song, switching to the playback mode, and viewing the playlist. After detecting an operation of tapping an icon 335 of Notepad on the interface 310 by the user, the tablet may display a GUI shown in FIG. 6(e).

Figure 6E:
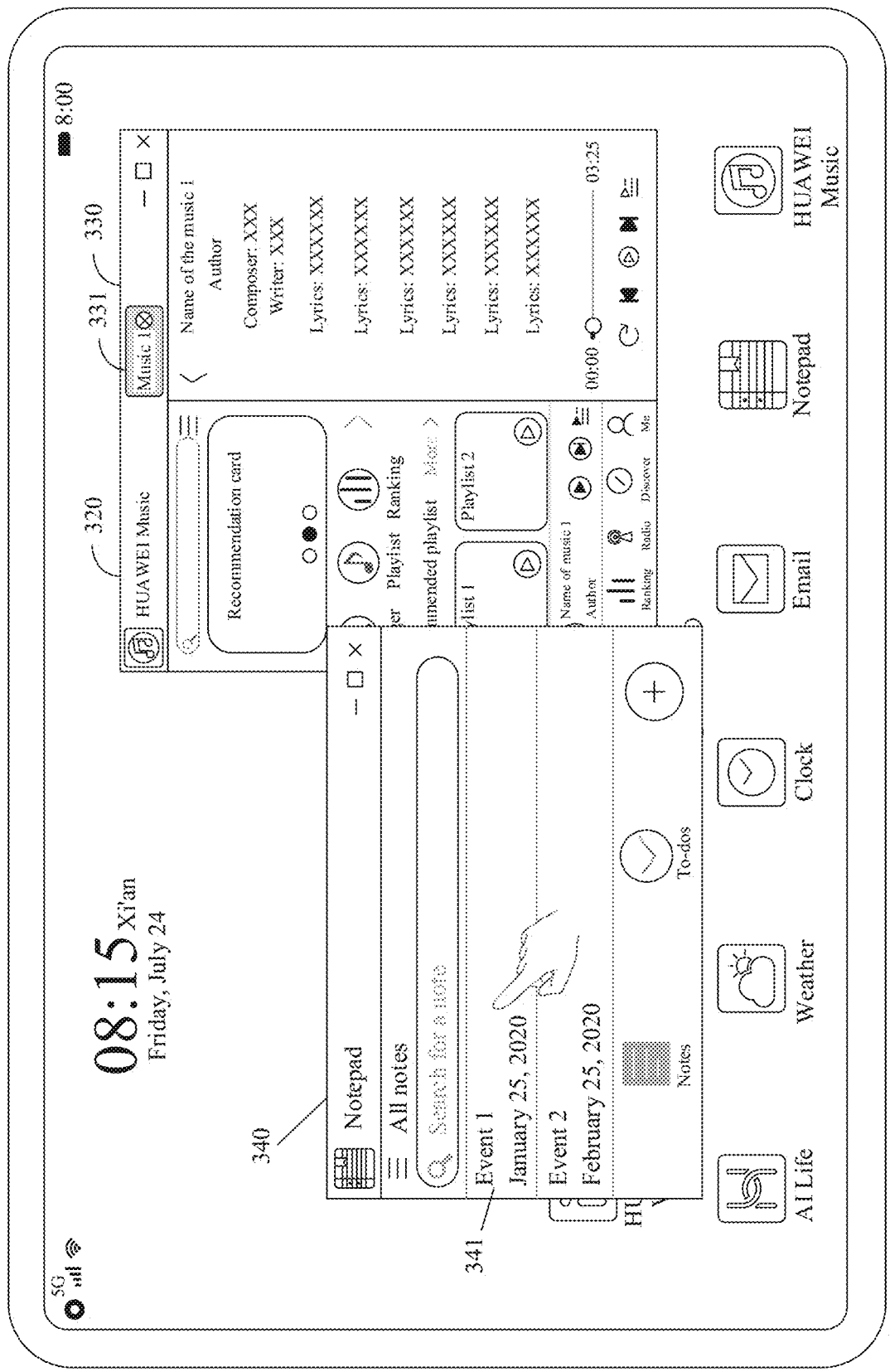

Refer to FIG. 6(e). Notepad is started in a floating mode. A display interface 340 of Notepad is displayed in landscape mode. The display interface 340 is superimposed on a display interface of HUAWEI Music. The display interface 340 may include a title bar and a content display interface located below the title bar. The title bar may include an icon of Notepad and text "Notepad". The content display interface may include a search box, a list of a plurality of notes, and the like. The list may include an event 1, an event 2, and the like. After detecting an operation of tapping an area 341 of the event 1 by the user, the tablet may display a GUI shown in FIG. 6(f).

It should be understood that, in this embodiment of this application, when the user continues to open another application, the another application continues to be started in a floating mode, and is superimposed on HUAWEI Music and Notepad. That is, a newly opened application is displayed in the foreground, and the user may tap to move a background application to the foreground. For example, when the user taps an interface of HUAWEI Music, HUAWEI Music may be displayed in the foreground, and the user may further tap to drag and move a location of the application on a tablet desktop.

In some possible embodiments, a size of a floating window of Notepad may be adjusted. In response to a drag operation performed on an edge of the floating window, the electronic device adjusts a shape and a location of the floating window of Notepad.

It should be understood that, in this embodiment of this application, in a floating mode, whether an application is started in landscape mode or in portrait mode is related to the application itself. When developing the application, a developer may specify whether the application is started in landscape mode or in portrait mode. When the application is started in landscape mode, a width of a home page interface of the application should be less than or equal to a half of a width of a display of the tablet, so that an extended interface of the application can be prevented from exceeding a display interface of the tablet, to avoid incomplete display of the extended interface.

Figure 6F:
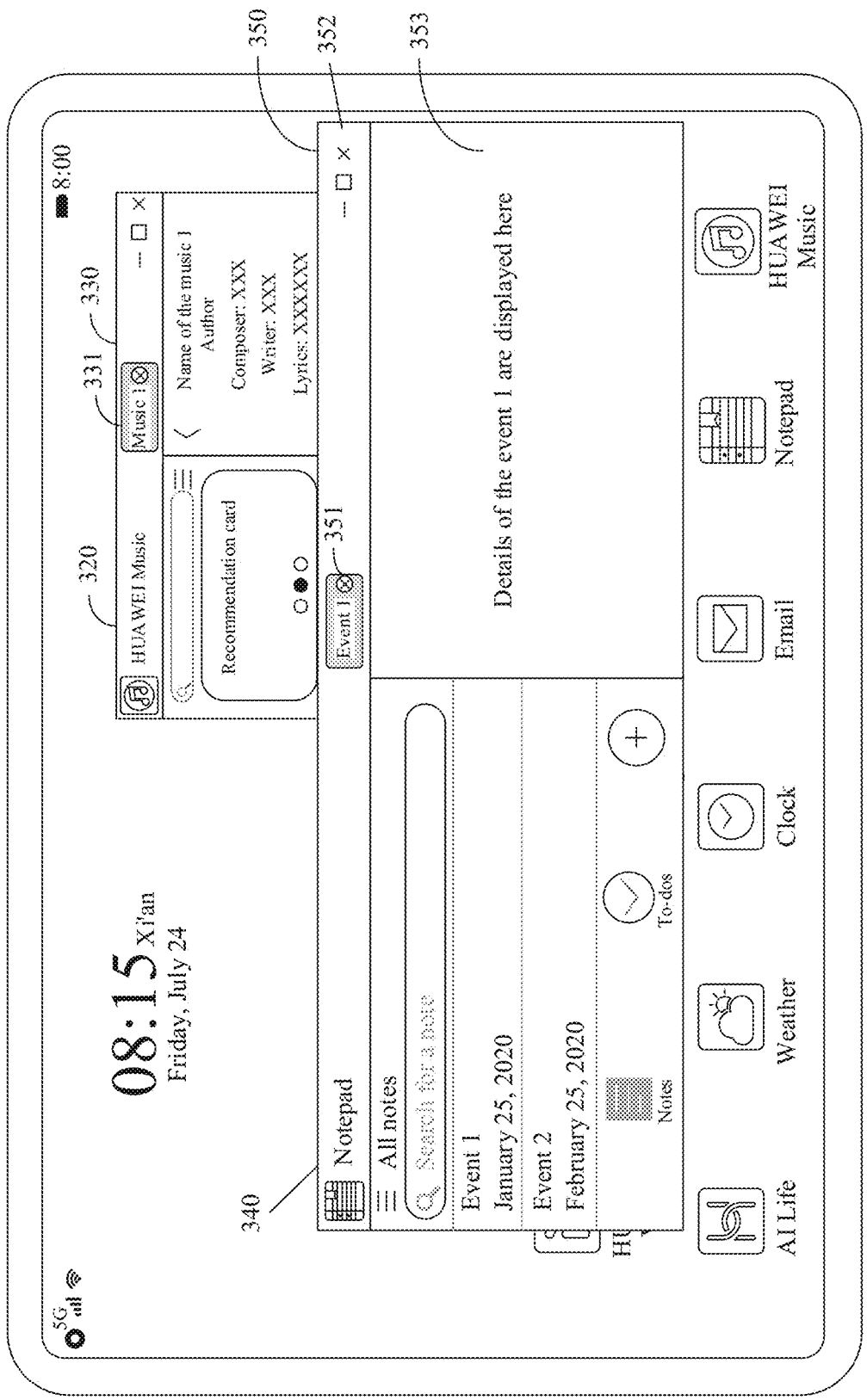

Refer to FIG. 6(f). An extended interface 350 appears on the right of the original display interface 340 of Notepad. The extended interface 350 may include a title bar 352 and a content display part 353 located below the title bar. Specific content of the event 1 may be displayed in the content display part. The title bar 352 may include a subtitle label 351, and the subtitle label 351 may include a word "event 1" and a control for closing the extended interface 350.

It should be understood that a title bar on the original display interface 340 and the title bar on the extended interface 350 may be a same title bar. In this case, when the extended interface appears, the title bar is double-extended to the right, and is used to display a subtitle label of the extended interface. The title bar on the original display interface 340 and the title bar on the extended interface 350 may also be different.

In some possible embodiments, a size of a floating window of Notepad may be adjusted. In response to a drag operation performed on an edge of the floating window, the electronic device adjusts a shape and a location of the floating window of Notepad.

In some possible embodiments, display ratios of the content display part 341 and the content display part 353 in the floating window may be adjusted. In response to an operation performed on an area in which the content display part 341 and the content display part 353 meet, the electronic device can adjust horizontal proportions of the content display part 341 and the content display part 353 on the display interface 340.

It should be understood that this embodiment of this application is also applicable to an operation performed after the tablet enters the computer mode. For example, a click in this embodiment of this application may be completed by using a mouse.

According to this embodiment of this application, the plurality of applications may be started on the tablet desktop in a form of a floating window, and each of the plurality of applications may be displayed in a plurality of windows. According to this technical solution, the plurality of applications may be displayed on the tablet desktop, so that the user can use the plurality of applications simultaneously, for example, the user can perform multi-application collaborative office. This improves user experience.

FIG. 7(a) to FIG. 7(d) are schematic diagrams of another group of GUIs according to an embodiment of this application. A process in which a user starts and uses an application on a tablet is shown in FIG. 7(a) to FIG. 7(d).

Figure 7A:
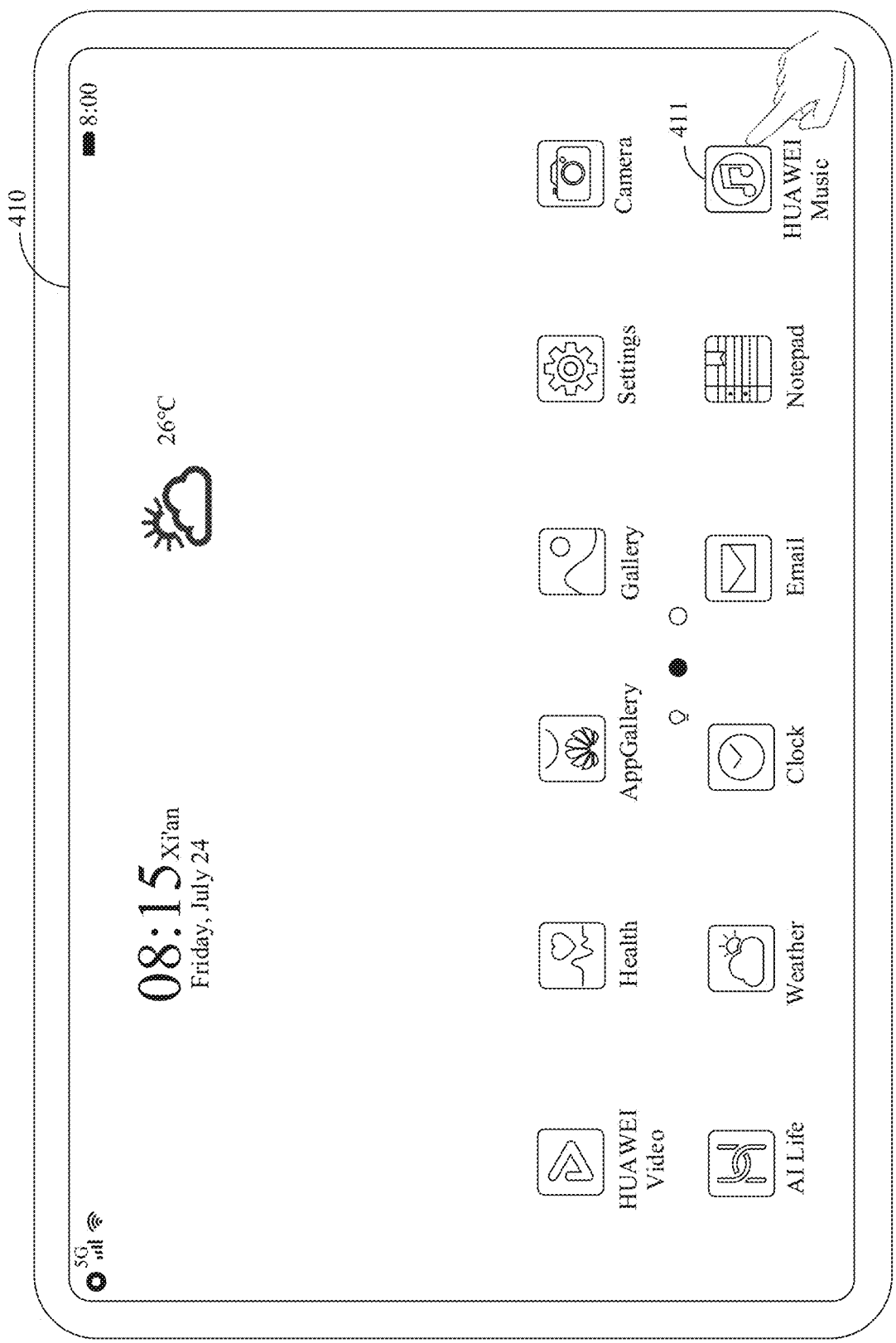
FIG. 7(a) to FIG. 7(d) are schematic diagrams of another group of GUIs according to an embodiment of this application.

For FIG. 7(a), refer to related descriptions of FIG. 3(a). Details are not described again.

Figure 7B:
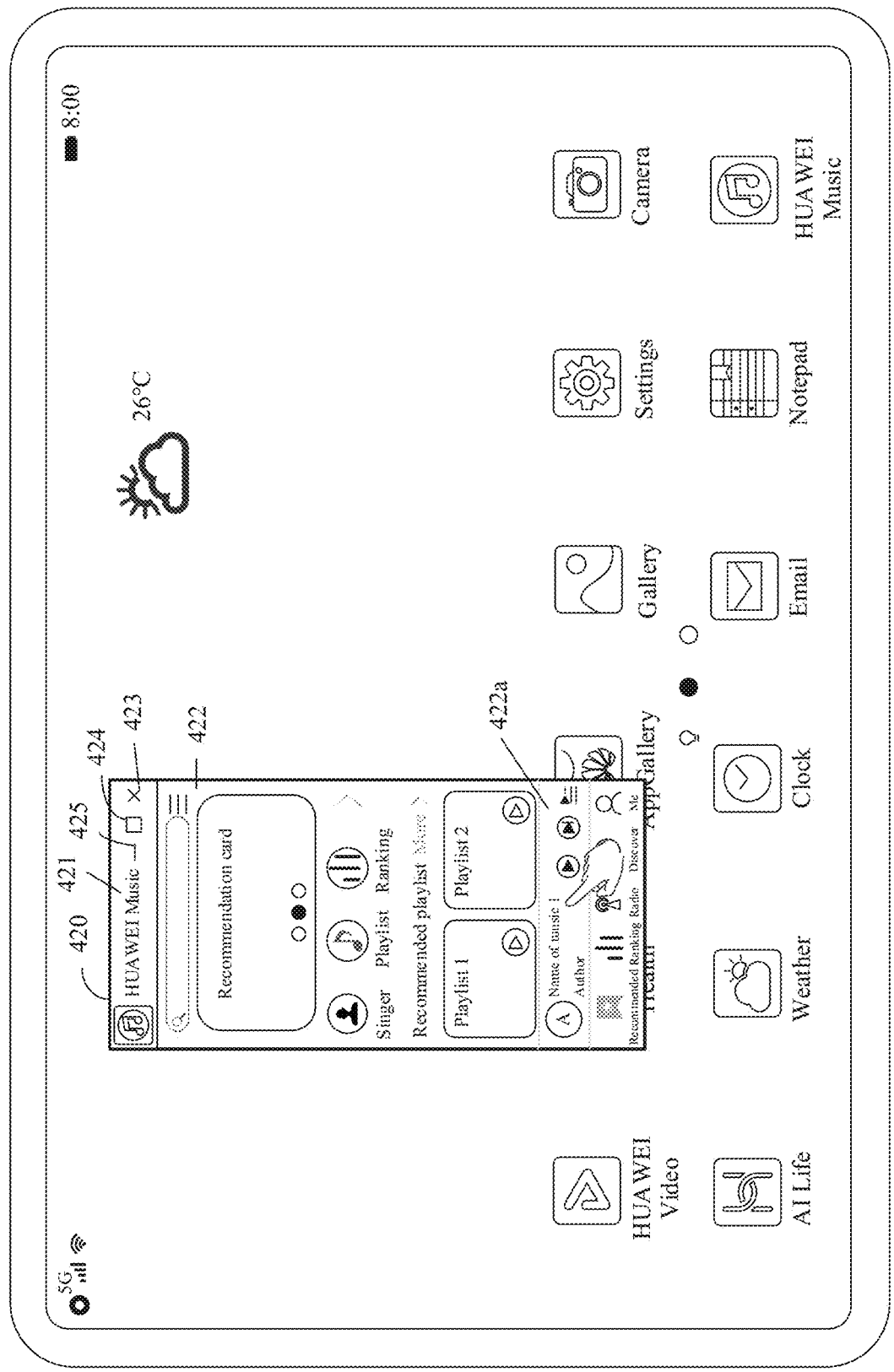

For FIG. 7(b), refer to related descriptions of FIG. 3(c). Details are not described again.

Figure 7C:
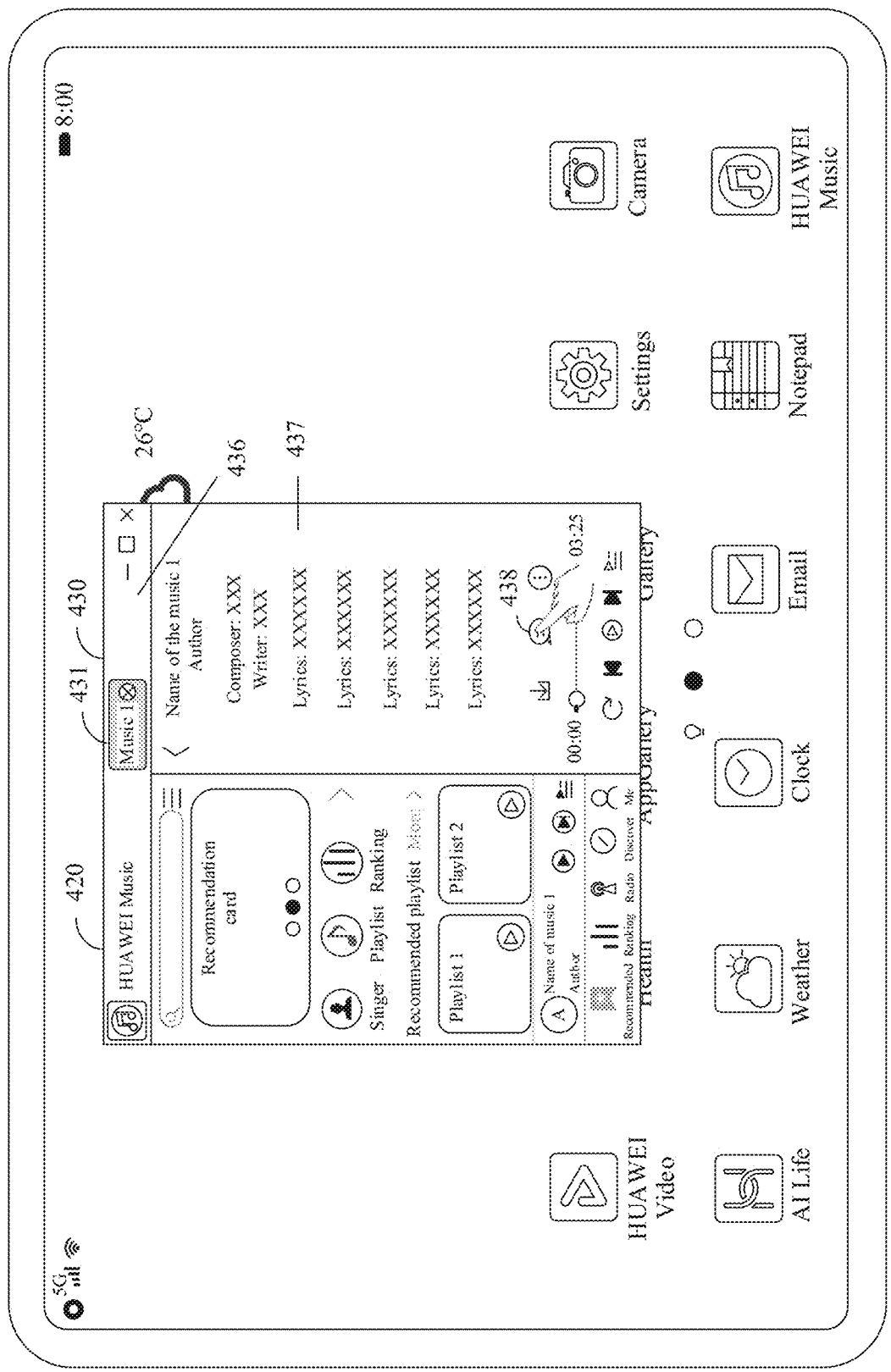

Refer to FIG. 7(c). An extended interface 430 is displayed on the right of a display interface 420 of HUAWEI Music. The extended interface 430 may include a title bar 436 and a playback interface 437. The playback interface 437 may include lyrics, a playback progress bar, a playback control button, and the like. The playback interface 437 may further include a comment control 438. After detecting an operation of tapping the comment control 438 by the user, the tablet may display a GUI shown in FIG. 7(d).

Figure 7D:
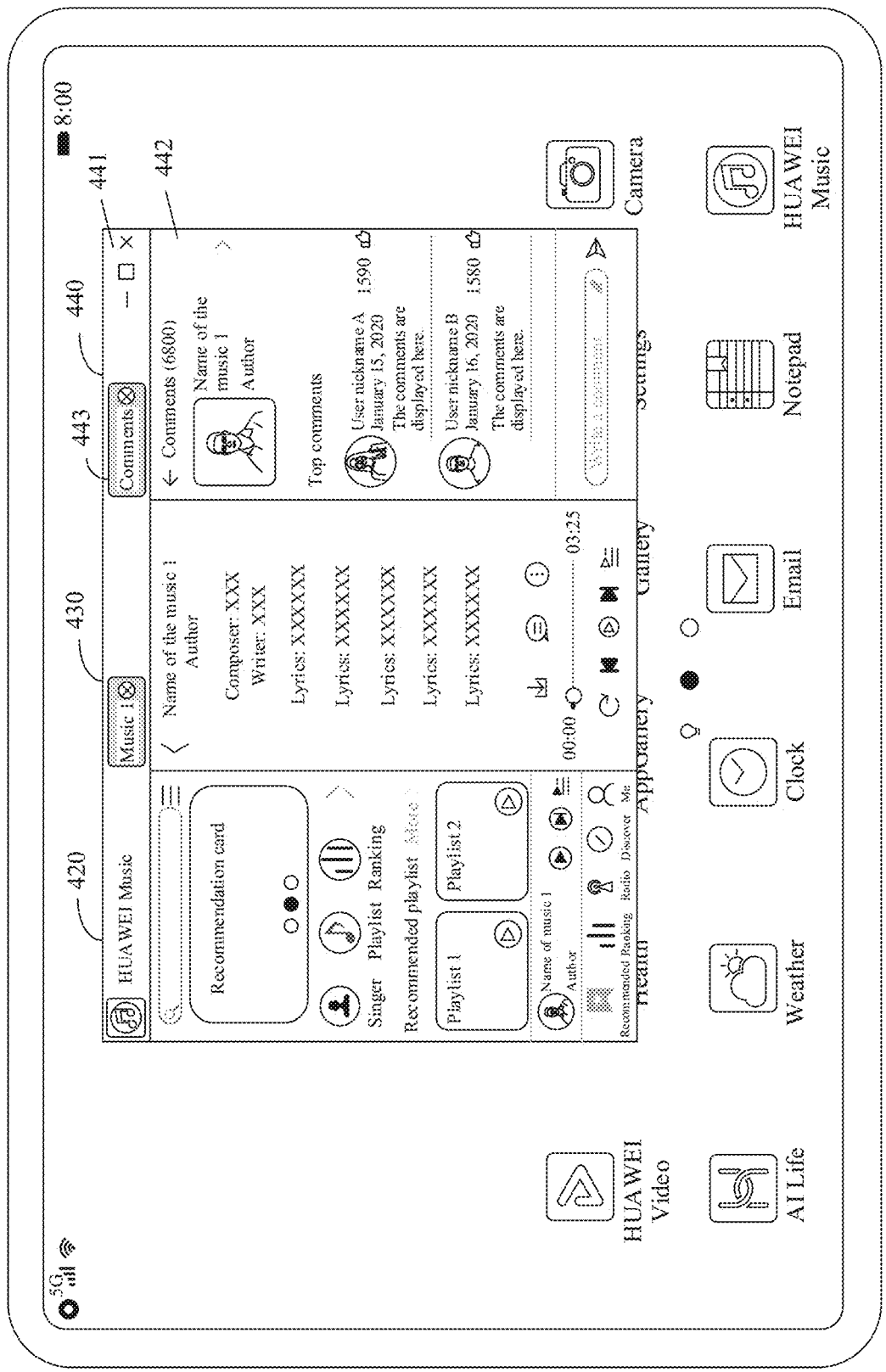

Refer to FIG. 7(d). The extended interface 430 is provided on the right of the display interface 420 of HUAWEI Music. A second extended interface 440 is displayed on the right of the extended interface 430. The extended interface 440 may include a title bar 441 and a comment display area 442. The title bar 440 may include a subtitle label 443, and the subtitle label 443 may include a "comment" on a name of a subtitle and a close control for closing the extended interface 440. The comment display area 442 may include a quantity of comments, a name of the music 1, an author, a list of comments from other users, a comment input box, and the like. The user may enter a comment in the comment input box.

In some possible embodiments, in response to a drag gesture performed on the subtitle label 443, on the electronic device, the label 443 is dragged to an area of the extended interface 430, and then a diagram similar to the schematic diagram of the extended interface shown in FIG. 4(d) is obtained. In this case, the extended interface 430 overlaps the extended interface 440 for display. In some embodiments, in response to a user operation, the electronic device may switch from the schematic diagram of the extended interface shown in FIG. 4(b) to the schematic diagram of the extended interface shown in FIG. 7(d), that is, all overlapping extended interfaces are displayed in an extended manner. In this case, the electronic device optionally adjusts a location and a size of the display interface 420 or the extended interface 430 or the extended interface 440 according to a size of a display of the electronic device.

In some possible embodiments, the electronic device displays an extended interface in an extended manner, and adjusts the extended interface based on an attribute of the extended interface and/or a related configuration of the extended interface. For example, when it is declared that the extended interface needs to be displayed in a size (for example, a width) different from that of the display interface 420, the electronic device needs to perform adaptation.

In this embodiment of this application, the display interface 420 of HUAWEI Music, the first extended interface 430, and the second extended interface 440 may share a same title bar, or different title bars may be used on these interfaces. This is not limited in this embodiment of this application.

It should be understood that this embodiment of this application is also applicable to an operation performed after the tablet enters the computer mode. For example, a click in this embodiment of this application may be completed by using a mouse.

According to this embodiment of this application, when the user starts an application in a floating mode, a plurality of interfaces in the application can be displayed, so that the user can view content on a plurality of new opened interfaces when browsing an original interface. This improves user experience.

Figure 8:
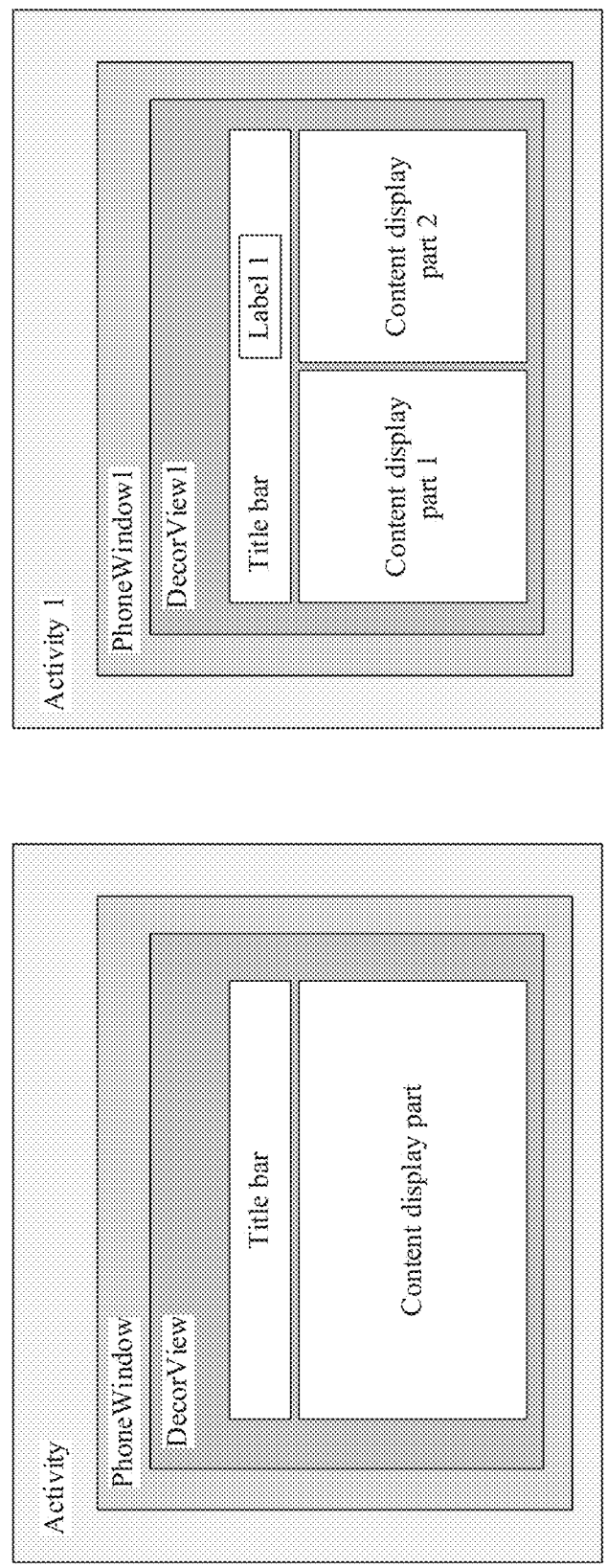
FIG. 8 is a schematic diagram of an activity framework according to an embodiment of this application.

FIG. 8 is a schematic diagram of an activity framework according to an embodiment of this application.

In the Android (Android) system, an activity (activity) is a component that may include a user interface, and is mainly configured to interact with a user, for example, making a call, taking a photo, sending an email, and viewing a map. In brief, content in an application that can be viewed by the user is mainly provided by the activity component. The application may include a plurality of activities.

Refer to (a) in FIG. 8. Each activity has a window object, but the window object is an abstract class. Android provides an implementation class phonewindow for a window. In other words, a window instance in the activity is a phonewindow object. The phonewindow object has a view object decorview. In the activity, most operations related to a view are performed through decorview. A layout style of decorview may include a title bar and a content display part.

Specifically, the activity may transfer a resource identifier corresponding to a layout file to decorview. After receiving the layout resource identifier, decorview converts the layout resource identifier into a layout view by using a layout filler, and then adds the layout view to itself. Then, the user may view the layout style on a screen of the electronic device.

For example, as shown in FIG. 3(c), after the user taps the application icon of HUAWEI Music, the tablet displays the display interface 320 of the home page of HUAWEI Music, which may be understood as that the system starts an activity 1 in the application. The title bar 321 and the content display part 322 included in the display interface 320 are a layout style.

In this case, w % ben a next activity 2 is started, an interface corresponding to the activity 2 covers an interface corresponding to the activity 1.

Refer to (b) in FIG. 8. An activity also has a window object, and Android provides an implementation class phonewindow for a window. The phonewindow object has a view object decorview. A difference lines in that when there is only one activity 1, a layout style of decorview may include a title bar and a content display part, which is the same as an existing layout; and when another activity 2 is started again, the title bar is double-extended to the right, and a title part of the activity 2 is added to an extended part of the title bar as a subtitle label (label); in addition, a content display part 2 of the activity 2 is displayed below the extended part of the title bar. In other words, when the next activity 2 is started, an interface corresponding to the activity 2 does not cover an interface corresponding to the activity 1, but is displayed as an extended interface on the right of the interface corresponding to the activity 1.

In some possible embodiments, an implementation of a content display part in an electronic device running the Android system is contentview.

In some possible embodiments, double-extending a title bar to the right is actually adjusting a size of a floating window and adjusting locations of controls in the title bar (for example, the control 423, the control 424, and the control 425 shown in FIG. 4(b)). For example, a size of an original window is 300 (width, unit pixel)*200 (height, unit pixel). After the title bar is double-extended to the right, a size of a new window becomes 600 (width, unit pixel)*200 (height, unit pixel).

For example, as shown in FIG. 3(c) and FIG. 3(d), the display interface 320 of the home page of HUAWEI Music may be considered as a display interface corresponding to the activity 1, and the display interface 320 includes the title bar 321 and the content display part 322. The operation of tapping the area 322a by the user may be considered as starting the activity 2. It can be seen that the display interface 330 corresponding to the activity 2 does not cover the original display interface 320, but is displayed as an extended interface on the right of the original display interface 320. In addition, the subtitle label 331 is displayed in the title bar on the extended interface 330, and the title bar and the title bar of the interface 320 are a same title bar.

Figure 9:
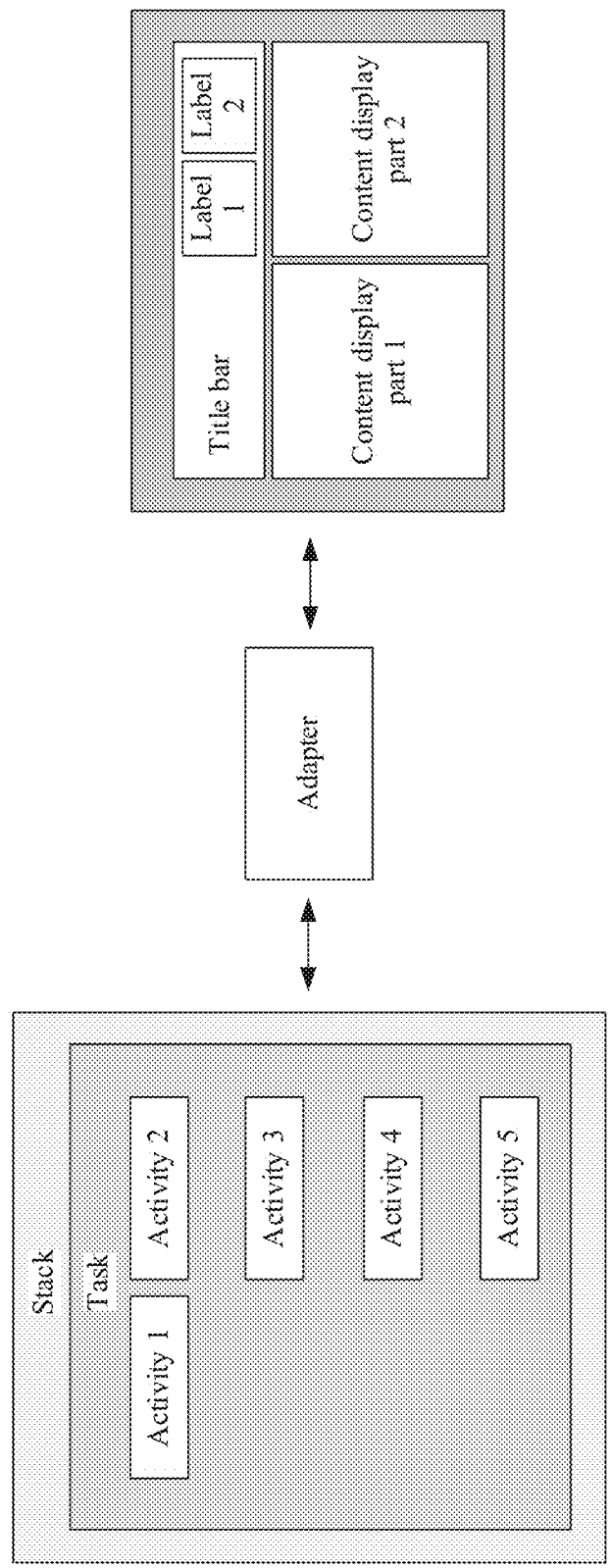
FIG. 9 is a schematic diagram of data transmission according to an embodiment of this application.

FIG. 9 is a schematic diagram of data transmission according to an embodiment of this application.

In the Android system, a task (task) is usually a set of a series of associated activities that are arranged in a stack (stack) based on a sequence of opening the activities. A home page of an electronic device is usually a start point of the task. When an another activity 2 is started in a current activity 1, the activity 2 is usually pushed to the top of the stack and becomes a focus point. The previous activity 1 is still reserved in the stack and is paused. When the activity 1 is paused, the system remains a current status of a corresponding user interface. When a user selects "Return", the current activity 2 at the top of the stack is destroyed and the activity 1 resumes execution.

For example, when an application like HUAWEI Music is opened in a mobile phone, a display interface of a home page of the application may be considered as an activity 1. When the user taps a playlist on the home page, it may be understood that an activity 2 is started in the activity 1. The mobile phone displays a new interface and the new interface covers the interface of the home page. In this case, a playlist interface becomes a focus point. When the user taps to return or swipes from an edge of a screen to return, the mobile phone displays the interface of the home page of HUAWEI Music.

However, in this embodiment of this application, when the another activity 2 is started in the current activity 1, the activity 2 is at the top of the stack, and the activity 1 is also at the top of the stack. In addition, the activity 1 is not paused, and a life cycle of the activity 1 continues to be reserved. A user interface corresponding to the activity 2 is displayed as an extended interface on the right of a user interface corresponding to the activity 1.

For example, as shown in FIG. 3(c) and FIG. 3(d), the display interface 320 of the home page of HUAWEI Music may be considered as a display interface corresponding to the activity 1, and the operation of tapping the area 322a by the user may be considered as starting the activity 2. The display interface 330 corresponding to the activity 2 does not cover the original display interface 320, but is displayed as an extended interface on the right of the original display interface 320.

As shown in FIG. 9, when the user taps an icon of an application, the system first creates a stack corresponding to the application, and then creates a task. The task includes an activity. Data (for example, a title and content) in the activity can be displayed on an interface only after the data is displayed by using controls such as a view control, a grid control, and a drop-down list. However, the activity cannot directly transfer the data to these controls without an adapter (adapter). Therefore, the adapter can be considered as a bridge between a control and a data source, and is configured to bind data to the control.

In this embodiment of this application, the activity can update the data to a control by using the adapter and present the data on the interface, so that the interface corresponding to the activity 2 is displayed as an extended interface on the right of the interface of the activity 1, and a title of the activity 2 is displayed in the title bar as a subtitle label. When the user starts an activity 3 in the activity 1, content displayed on the extended interface is an interface corresponding to the activity 3, and a title of the activity 3 is displayed as a subtitle on the right of the subtitle label of the activity 2 in the title bar. The user can tap to switch between content on the interface corresponding to the activity 2 and the interface corresponding to the activity 3.

In a possible implementation, the interface corresponding to the activity 1 is used as the home page, and the home page includes a title bar and a content display part. The activity 1 is on the top of the stack. When detecting an operation of starting the activity 2 (for example, tapping a control) by the user on the display interface corresponding to the activity 1, the electronic device extends a window of the display interface to twice as much as an original size, invokes a title name of the activity 2, and adds the title name of the activity 2 as a label to the title bar. In addition, the display interface corresponding to the activity 2 is moved to an extended window for display. In this case, the activity 2 is at the top of the stack, and the activity 1 is also at the top of the stack; that is, the activity 1 is not paused, but continues to maintain the life cycle.

In a possible implementation, the interface corresponding to the activity 1 is used as the home page, and the home page includes a title bar and a content display part. The activity 1 is on the top of the stack. When detecting an operation of starting the activity 2 (for example, tapping a control) by the user on the display interface corresponding to the activity 1, the electronic device extends a window of the display interface to twice as much as an original size, invokes a title name of the activity 2, and adds the title name of the activity 2 as a label to the title bar. In addition, the display interface corresponding to the activity 2 is moved to an extended window for display. In this case, both the activity 1 and the activity 2 are visible to the user, that is, the activity 1 is not paused, but continues to maintain the life cycle.

As shown in FIG. 4(b) and FIG. 4(c), the interface corresponding to the activity 1 is the display interface 620 of the home page of the App 1. When the user taps the video card or video control 626, it may be understood that the activity 2 is started. A display window of the App 1 is extended to twice as much as the display interface 620, a title name "title 1" of the activity 2 is invoked, and the "title 1" is added to a title bar of the display interface corresponding to the activity 1 as a label. The display interface 633 of the activity 2 is displayed on the extended interface. In this case, both the display interfaces 620 and 630 become focus points.

For example, the electronic device may read the title name of the activity 2 by invoking android.manifest.xml.

In another possible implementation, when detecting an operation of starting the activity 2 by the user on the display interface corresponding to the activity 1, the electronic device extends a window of the display interface to twice as much as an original size, invokes a title name of the activity 2, add the title name of the activity 2 as a label to a title bar of the display interface corresponding to the activity 2, and move the display interface corresponding to the activity 2 to an extended window for display.

According to the technical solution, a plurality of windows can be displayed in the application, so that when browsing an original interface, the user can view content on a plurality of new opened interfaces, and can tap to switch between the content on the plurality of interfaces. This improves user experience.

Figure 10:
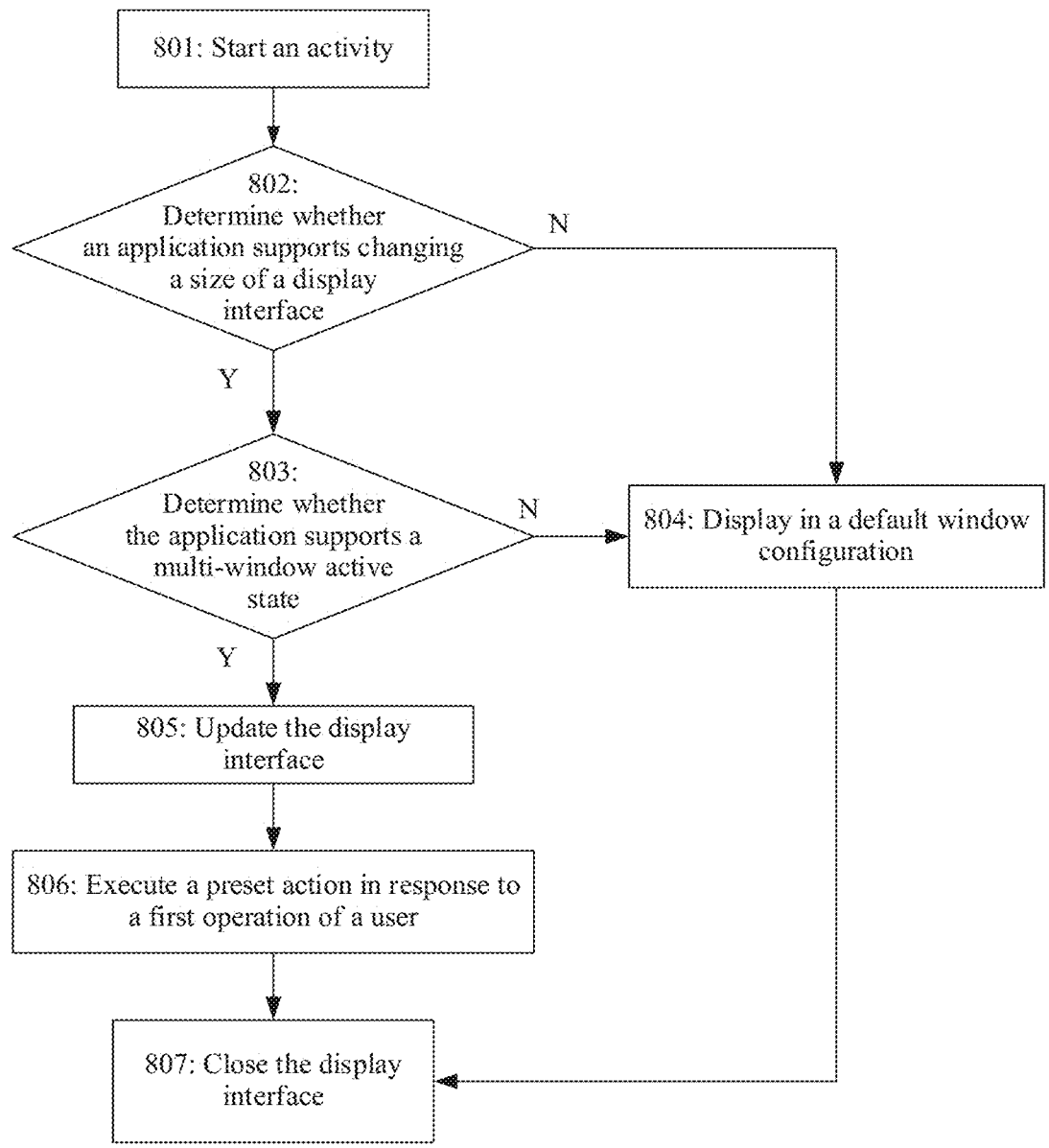
FIG. 10 is a schematic flowchart of a display method according to an embodiment of this application.

FIG. 10 is a schematic flowchart of a display method according to an embodiment of this application. As shown in FIG. 10, the method may include step 801 to step 807.

801: Start an activity.

In step 801, starting the activity may be understood as opening an application, and displaying a home page of the application.

For example, starting the activity may be that a user taps an icon of the application. As shown in FIG. 7(a) and FIG. 7(b), after the user taps the icon of HUAWEI Music, an activity 1 of HUAWEI Music is started. Starting the activity 1 may also be understood as creating the activity 1. Alternatively, starting the activity may be that the user clicks or double-clicks an icon of the application by using a mouse, as shown in FIG. 4(a) and FIG. 4(b).

802: Determine whether the application supports changing a size of a display interface.

It should be understood that whether the application supports changing the size of the display interface may be specified by a developer of the application. When developing the application, the developer of the application may write, into source code of the application, whether the application supports changing the size of the display interface. In a possible implementation, in an electronic device that runs the Android system, whether an application supports changing a size of a display interface is determined by determining whether the application supports resize.

In a possible implementation, if the developer declares that the application does not support changing the size of the display interface, the application is started in full screen by default.

In another possible implementation, if the developer declares that the application supports changing the size of the display interface, the application may be started in a form of a floating window.

In this embodiment of this application, step 802 is an optional step. To be specific, after the electronic device enables a floating mode, the user chooses to start the application in the floating mode, or the electronic device starts the application in the floating mode by default, the electronic device starts the application in the floating mode regardless of whether the application supports changing the size of the display interface. That is, the application is displayed on a desktop of the electronic device in the form of a floating window.

It should be noted that, when the application supports changing the size of the display interface, the application started in the form of a floating window retains an original interface display ratio of the application, but a display manner changes from full screen to a floating window. When the application does not support changing the size of the display interface, the application started in the form of a floating window resets an interface display ratio. A case in which the reset display interface ratio is different from an original interface display ratio may occur, for example, the reset interface ratio changes, or a size of an element on the interface changes.

803: Determine whether the application supports a multi-window active state.

In this embodiment of this application, whether the application supports the multi-window active state may be specified by the developer of the application. When developing the application, the developer of the application may write, into the source code of the application, whether the application supports the multi-window active state. The application that supports the multi-window active state can run in the form of a floating window, run in split screen, or run in a picture-in-picture mode. In a possible implementation, in the electronic device that runs the Android system, whether the application supports the multi-window active state is determined by determining whether the application supports multi-resume.

For example, when the application is developed, if the developer declares that the application does not support the multi-window active state, it means that the application can be started only in full screen, that is, an interface of a newly started activity covers an interface of a previous activity.

Specifically, after the user taps an icon of HUAWEI Music on a desktop of a mobile phone, the mobile phone displays a display interface of a home page of HUAWEI Music in full screen. It may be considered that the system starts an activity 1 of Huawei Music. When the user taps a playlist on the home page, it may be understood that an activity 2 is started in the activity 1. The mobile phone displays a new interface and the new interface covers the interface of the home page. In this case, a playlist interface becomes a focus point. When the user taps to return or swipes from an edge of a screen to return, the mobile phone displays the interface of the home page of HUAWEI Music.

For example, in this embodiment of this application, when the application is developed, if the developer declares that the application supports the multi-window active state, it means that the application may be started in full screen, or may be displayed in split screen, and both display interfaces may be in an active state.

Specifically, as shown in FIG. 6(*c*) and FIG. 6(*d*), HUAWEI Music supports the multi-window active state, the display interface 320 of the home page of HUAWEI Music may be considered as a display interface corresponding to the activity 1, and the operation of tapping the area 322*a* by the user may be considered as starting the activity 2. It can be seen that the display interface 330 corresponding to the activity 2 does not cover the original display interface 320, but is displayed as an extended interface 330 on the right of the original display interface 320. Both the display interface 320 and the extended interface 330 are in an active state.

804: When the application does not support the multi-window active state, the application is displayed in a default window configuration.

It should be understood that the default window configuration may be understood as displaying in full screen, that is, when the application does not support the multi-window active state, the application is started in full screen by default.

805: Update the display interface.

In this embodiment of this application, updating the display interface may be understood as a change of a display interface of the electronic device occurring when the user starts one or more other activities in the activity 1.

In a possible implementation, when detecting an operation of starting the activity 2 in the activity 1 by the user, the electronic device extends a window occupied by the display interface of the application to twice as much as an original size, invokes android.manifest.xml to read a title name of the activity 2, adds the title name of the activity 2 to an extended title bar, and moves the display interface corresponding to the activity 2 to the extended window for display. Therefore, both the display interface corresponding to the activity 1 and the display interface corresponding to the activity 2 are in an active state.

For example, as shown in FIG. 3(*c*), FIG. 3(*d*), and FIG. 3(*e*), the display interface corresponding to the activity 1 is the display interface 320 of the home page of HUAWEI Music. The display interface 320 includes the title bar 321 and the content display part 322. When the user taps the area 322*a*, it may be understood that the activity 2 is started in the activity 1. The interface 330 corresponding to the activity 2 is displayed as an extended interface on the right of the interface 320 corresponding to the activity 1, and a title of the activity 2 is displayed as a subtitle in an extended title bar. A content display part of the activity 2 is displayed in an extended window, that is, below the title bar.

In another possible implementation, when detecting an operation of starting the activity 2 in the activity 1 by the user, the electronic device extends a window occupied by the display interface of the application to twice as much as an original size, generates a label 1 for identifying an extended interface, adds the label 1 to an extended title bar, and moves the display interface corresponding to the activity 2 to the extended window for display. Therefore, both the display interface corresponding to the activity 1 and the display interface corresponding to the activity 2 are in an active state.

In another possible implementation, when detecting an operation of starting the activity 2 in the activity 1 by the user, the electronic device extends a window occupied by the display interface of the application to twice as much as an original size, identifies text content tapped by the user when the user starts the activity 2, adds the text content as a label to an extended title bar, and moves the display interface corresponding to the activity 2 to the extended window for display. Therefore, both the display interface corresponding to the activity 1 and the display interface corresponding to the activity 2 are in an active state.

It should be understood that, in the foregoing several possible implementations, after the activity 2 is started, the display interface corresponding to the activity 2 and the display interface corresponding to the activity 1 share a same title bar. In some embodiments, the activity 2 and the activity 1 may separately have a corresponding title bar. For example, when it is detected that the activity 2 is started, the electronic device extends the window occupied by the display interface of the application to twice as much as the original size, obtains the title name of the activity 2, adds the title name of the activity 2 to a title bar on the display interface corresponding to the activity 2, and moves the display interface corresponding to the activity 2 to the extended window for display.

806: Execute a preset action in response to a first operation of the user.

For example, as shown in FIG. 3(e), the user may switch the display interface by tapping the subtitle label in the title bar. For example, the user may display, on the extended interface by tapping the subtitle label of the music 1 in the title bar, a display interface corresponding to the music 1, and the user may further close the display interface corresponding to the music 1 by tapping a close control in the subtitle label of the music 1 in the title bar.

807: Close the display interface.

For example, as shown in FIG. 3(e), the user may close, by tapping the close control in the subtitle label in the title bar, an extended interface corresponding to the subtitle; and the user may close the entire HUAWEI Music by tapping the close control in the rightmost part of the title bar.

According to this embodiment of this application, a plurality of windows in an application can be displayed, so that when browsing an original interface, the user can view content on a plurality of new opened interfaces, and can tap to switch between the content on the plurality of interfaces. This improves user experience.

Figure 11:
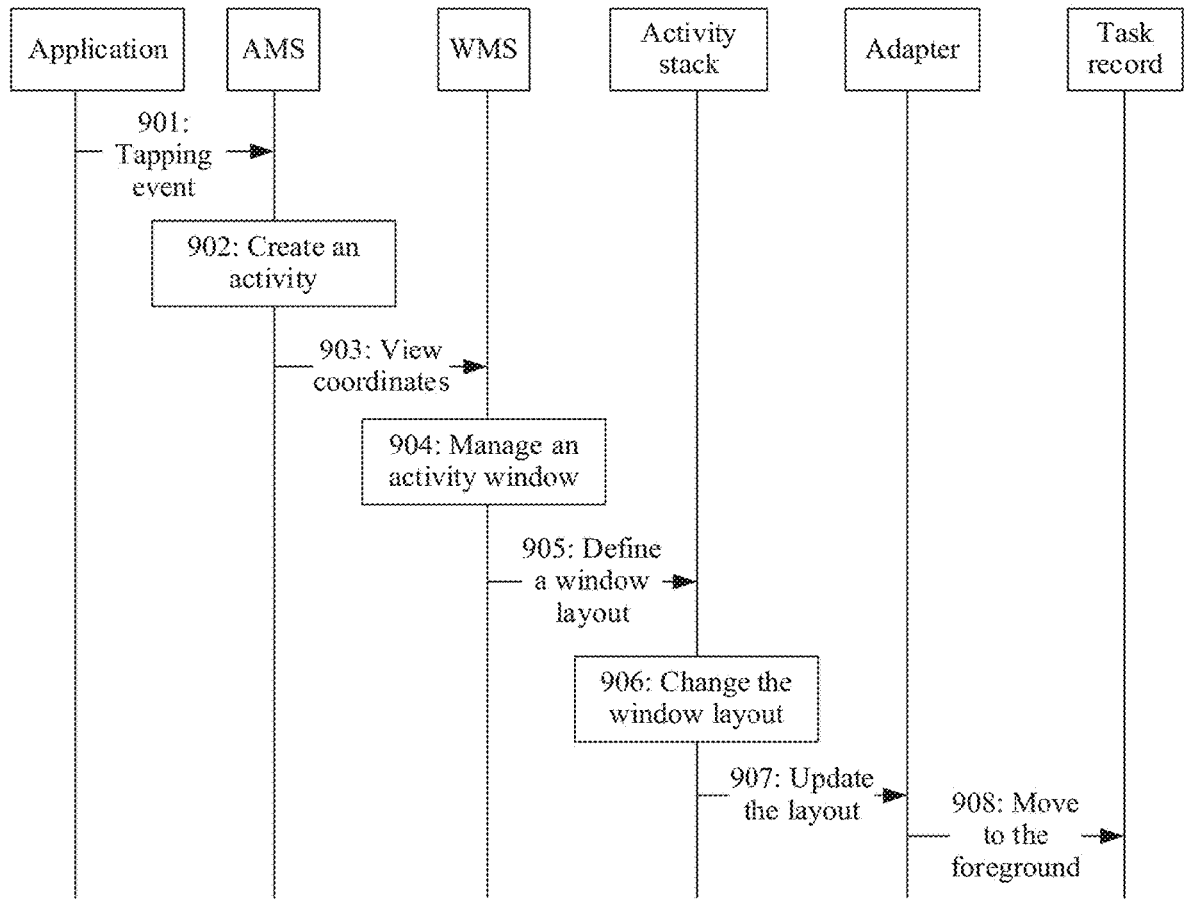
FIG. 11 is a schematic sequence diagram of a display method according to an embodiment of this application.

FIG. 11 is a schematic sequence diagram of a display method according to an embodiment of this application. The sequence diagram may include step 901 to step 908.

901: A user taps an icon of an application.

For example, the user taps an application icon of HUAWEI Music on a desktop of a tablet.

902: An AMS creates an activity 1 corresponding to the application.

For example, in response to tapping the icon of HUAWEI Music by the user, the AMS creates an activity 1 corresponding to HUAWEI Music.

903: The AMS sends view coordinates in the activity 1 to a WMS.

904: The WMS manages an activity window, for example, a location and a size of a display interface corresponding to the activity 1 on the desktop of the tablet.

905: The WMS sends a defined activity window layout to an activity stack.

For example, activities are arranged in a stack based on a sequence of opening the activities. Generally, an interface corresponding to an activity on the top of the stack becomes a focus point and is displayed on a screen. In this embodiment of this application, both the activity 1 and an activity 2 opened in the activity 1 are on the top of the stack. The WMS may set a window of the activity 2 to be displayed on the right of a window of the activity 1.

906: The activity stack changes a size of the activity window.

An activity in the activity stack changes the size of the activity window based on a window layout form of the WMS.

907: The activity stack updates a layout form of the activity window by using an adapter.

Data (for example, a title and content) in the activity can be displayed on an interface only after the data is displayed by using controls such as a view control, a grid control, and a drop-down list. However, the activity cannot directly transfer the data to these controls without the adapter.

For example, the activity can update the data to a control by using the adapter and present the data on the interface, to change an interface in the window.

908: As selected by the user, move the activity to the foreground by using the adapter, delete the activity, restart the activity, and the like.

A task record (task record) is used to record a sequence of the activities.

Figure 12:
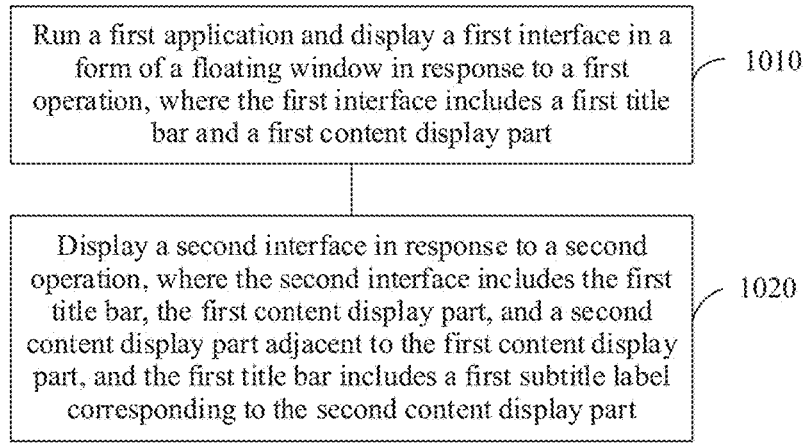
FIG. 12 is a schematic flowchart of a display method according to an embodiment of this application.

FIG. 12 is a schematic flowchart of a display method according to an embodiment of this application. As shown in FIG. 12, the method is applied to an electronic device, and the method may include step 1010 to step 1020.

1010: The electronic device runs a first application and displays a first interface in a form of a floating window in response to a first operation, where the first interface includes a first title bar and a first content display part.

The first operation may be an operation of starting the first application by a user. For example, the user taps an icon of the first application, or the user taps and holds the icon of the first application to select a startup manner, or the user clicks the icon of the first application by using a mouse.

For example, as shown in FIG. 3(a), the first operation may be that the user taps the icon 311 of HUAWEI Music to start HUAWEI Music. Alternatively, as shown in FIG. 3(b), the first operation may be an operation of touching and holding the icon 311 of HUAWEI Music, and selecting, from the pop-up option 312, the floating startup 312b by the user. Alternatively, as shown in FIG. 4(a), the first operation may be that the user double-clicks or clicks the icon of the App 1 by using a mouse.

The first interface is displayed in the first application in the form of a floating window, that is, a display interface of the first application is suspended on a display desktop of the electronic device. As shown in FIG. 3(c), the display interface 320 of the first application is displayed on the display desktop of the tablet in the form of a floating window.

The first interface includes the first title bar and the first content display part. As shown in FIG. 3(c), the first application may be HUAWEI Music, the first interface may be the display interface 320 of the home page of HUAWEI Music, the first title bar may be the title bar 321 of HUAWEI Music, and the first content display part may be the content display part 322 of HUAWEI Music.

The first title bar may further include an application icon, an application name, and the like of the first application.

The first content display part may be display content of a home page of the first application.

Optionally, the first title bar may further include a first control for closing the first application, a second control for maximizing display of the first application, and a third control for minimizing display of the first application.

For example, as shown in FIG. 4(*b*), the first control may be the control 625, the second control may be the control 624, and the third control may be the control 623.

1020: The electronic device displays a second interface in response to a second operation. The second interface includes the first title bar, the first content display part, and a second content display part adjacent to the first content display part. The first title bar includes a first subtitle label corresponding to the second content display part.

The second operation may be that the user taps a control in the first content display part. The control corresponds to a new activity. The second operation may be understood as starting a new activity.

In this embodiment of this application, the second interface includes the first title bar, the first content display part, and the second content display part. It should be understood that the first title bar on the second interface is a title bar extended above the first content display part and the second content display part. The title bar further includes the first subtitle label corresponding to the second content display part.

For example, as shown in FIG. 3(*d*), the second interface may be an entire display interface of HUAWEI Music, including the display interface 320 and the display interface 330. The first title bar may be the title bar 321, the first content display part may be the content display part 322, and the second content display part may be a content display part 330*a*. The title bar 321 is located above the content display part 322 and the content display part 330*a*, that is, the content display part 322 and the content display part 330*a* share the same title bar 321. The title bar 321 further includes the subtitle label 331 corresponding to the content display part 330*a*.

In this embodiment of this application, the second content display part is adjacent to the first content display part, and the second content display part may be located on the right side of the first content display part, or may be located on the left side of the first content display part. In this embodiment of this application, "adjacent" may mean that the second content display part does not overlap the first content display part.

For example, a size of the first content display part is 200 (width, unit pixel)*300 (height, unit pixel). When the second content display part appears, a size of the first content display part to the second content display part is 400 (width, unit pixel)*300 (height, unit pixel).

It should be understood that, in this embodiment of this application, a window size of the second interface may be twice a window size of the first interface.

According to this embodiment of this application, when the user starts an application, a first interface of the application is suspended on the desktop of the electronic device, and when the user selects a control on the first interface, the electronic device displays a second interface. The second interface includes a first title bar, a first content display part, and a second content display part adjacent to the first content display part. The first title bar includes a first subtitle label corresponding to the second content display part. According to the technical solution, a plurality of interfaces in the application can be displayed, so that the user can view content on a plurality of new opened interfaces when browsing an original interface. This improves visual effect of the application and improves immersive experience of the user.

Optionally, the electronic device may alternatively be in a desktop mode. For example, the electronic device detects an external keyboard or a virtual keyboard, or the electronic device is a projected device.

Optionally, before the electronic device displays the second interface in response to the second operation, the method further includes: In response to the second operation, the electronic device obtains the first subtitle label by using a first configuration file.

For example, the electronic device may obtain the first subtitle label by invoking or accessing an Android.manifest.xml file. The first subtitle label may be a title name of an activity corresponding to the second content display part.

Optionally, before the electronic device displays the second interface in response to the second operation, the method further includes: The electronic device generates the first subtitle label in response to the second operation.

For example, if the electronic device detects a second operation of the user, for example, starting a new activity 1, the electronic device may generate the first subtitle label, and add the subtitle label to the first title bar. The first subtitle label may be a label 1 that serves as an identifier, or the like. It should be understood that, when the user starts an activity 2, another subtitle label, for example, a label 2, may be generated and added to the first title bar. In this case, the title bar may include the two subtitle labels. That is, the subtitle label is generated based on a sequence of opening the activities, as shown in FIG. 4(*e*).

Optionally, the first title bar includes the highlighted first subtitle label. The first subtitle label includes a first label name and a control for closing the second content display part. The first subtitle label is located above the second content display part.

In this embodiment of this application, the first label name may be the title name of the activity corresponding to the second content display part. For example, the first label name may be obtained by the electronic device by invoking android.manifest.xml. The first label name may alternatively be the label 1 that serves as an identifier, another identification name, or the like.

For example, as shown in FIG. 6(*d*), the first subtitle label is the subtitle label 331, and the name of the first label is "music 1", namely, the title name of the activity corresponding to the second content display part. The subtitle label 331 further includes a control for closing the second content display part.

According to this embodiment of this application, the first title display bar includes the highlighted first subtitle label. This technical solution helps remind the user of a currently opened interface.

Optionally, the method further includes: The electronic device displays a third interface in response to a third operation. The third interface includes the first title bar, the first content display part, and a third content display part adjacent to the first content display part. The first title bar includes a highlighted second subtitle label. The first subtitle label becomes non-highlighted. The second subtitle label includes a second label name and a control for closing the third content display part.

The third operation may be that the user starts a new activity on the second interface, for example, tapping a control. The control may be located in the first content display part, or may be located in the second content display part.

The third content display part is a display interface corresponding to the new activity.

For example, as shown in FIG. 4(c), the third operation may be the operation of clicking the area 635 by the user by using the mouse.

For example, as shown in FIG. 3(d), the third operation may be the operation of clicking the control 323a by the user.

As shown in FIG. 3(e), the third interface may be an entire display interface of HUAWEI Music, the first title bar is the title bar 321, the first content display part is the content display part 322, and the third content display part is the content display part 330b. The second subtitle label is the subtitle label 332, and the second label name is "singer", namely, a title name of an activity corresponding to the content display part 330b. The subtitle label 332 further includes a control for closing the content display part 330b.

The second label name in the second subtitle label may alternatively be the label 1 that serves as an identifier, another identification name, or the like.

The technical solution helps the user browse a display interface in a plurality of windows corresponding to an application. This improves multi-screen collaboration experience. In addition, the highlighted second subtitle control better serves as an identifier.

Optionally, the electronic device displays the second interface in response to a fourth operation of the user. The first subtitle label in the first title bar becomes highlighted, and the second subtitle label becomes non-highlighted.

The fourth operation may be an operation of tapping the first subtitle label by the user, or may be an operation of switching a page by another user.

For example, as shown in FIG. 3(e), after detecting an operation of tapping the subtitle label 331 by the user, the electronic device may highlight the subtitle label 331 and change the subtitle label 332 to a non-highlighted state for display. The title bar 321, the content display part 322, and the content display part 330a corresponding to the subtitle label 331 are displayed. According to this technical solution, a home page of the application may continue to be displayed, and switching between the second display part and the third content display part is performed based on an operation of the user. This improves multi-screen collaboration experience.

Optionally, a sum of side lengths of the first content display part and the second content display part in a first direction is less than or equal to a length of a side that is of a display desktop of the electronic device and that is parallel to the first direction.

For example, the first direction is a direction of a width of the electronic device.

According to this embodiment of this application, display sizes of the first content display part and the second content display part in the first direction are limited within the display desktop, to avoid incomplete display of content on an extended interface of the application.

Optionally, a side length of the first interface in a second direction is less than a length of a side that is of the display desktop of the electronic device and that is parallel to the second direction.

For example, the second direction is a direction of a height of the electronic device.

According to this technical solution, a size of the display interface of the first application may be limited within the display desktop, to avoid incomplete display.

Optionally, a first side length of the first content display part in the first direction is less than or equal to a second side length of the second content display part in the first direction.

Optionally, the first side length and the second side length are adjustable, and a sum of the first side length and the second side length remains unchanged.

For example, as shown in FIG. 3(e), the user may press and hold a location of a boundary between the content display part 322 and the content display part 330b, and move leftward and rightward to change a lateral proportion of the content display part 322 to the content display part 330b.

According to this embodiment of this application, the user can change the size of the display interface based on an actual requirement. This improves user experience.

Optionally, the electronic device runs the second application and displays a fifth interface of the second application in the form of a floating window in response to a fifth operation.

The fifth operation may be an operation of starting the second application by the user, for example, an operation of tapping an application icon of the second application by the user by using a finger, or an operation of tapping an application icon of the second application by the user by using a mouse.

For example, as shown in FIG. 6(d) and FIG. 6(e), the second application may be Notepad, and the fifth interface is a display interface of a home page of Notepad. After the user taps an application icon 335 of Notepad, the electronic device runs Notepad and displays the display interface 340 of the home page of Notepad in the form of a floating window.

According to this embodiment of this application, the electronic device can further start the second application, and a display interface of the second application is also suspended on the display desktop of the electronic device. This technical solution helps the user simultaneously use a plurality of applications for collaborative office and the like. This improves user experience.

Optionally, before the electronic device runs the first application and displays the first interface in the form of a floating window in response to the first operation, the method further includes: determining that the first application supports changing a size of the display interface.

According to this embodiment of this application, when determining that the first application supports changing the size of the display interface, the electronic device may start the first application in the form of a floating window. It should be understood that whether the application supports changing the size of the display interface may be specified by a developer of the application when developing the application.

Optionally, when determining that the first application does not support changing the size of the display interface, the electronic device may start the application in full screen, or start the application in the form of a floating window, but a layout and a scale of the display interface of the application may change.

Optionally, the method further includes: determining that the first application supports a multi-window active state.

According to this embodiment of this application, when determining that the first application supports the multi-window active state, the electronic device may start the first application in the form of a floating window. It should be understood that whether the application supports the multi-window active state may be specified by a developer of the application when developing the application.

Optionally, when determining that the first application does not support the multi-window active state, the electronic device may start the application in full screen, or start the application in the form of a floating window, but a layout and a scale of the display interface of the application may change.

Optionally, both the first content display part and the second content display part on the second interface are in an active state.

In this embodiment of this application, that both the first content display part and the second content display part are in the active state may be understood as that both the first content display part and the second content display part are focus points of a display of the electronic device.

Optionally, both the first content display part and the third content display part on the third interface are in an active state. An embodiment of this application further provides an electronic device. The electronic device includes one or more processors and one or more memories. The one or more memories store one or more computer programs. The one or more computer programs include instructions. When the instructions are executed by the one or more processors, the display method according to any one of the foregoing possible implementations is performed.

An embodiment of this application further provides a chip. The chip includes a processor and a communication interface. The communication interface is configured to: receive a signal and transmit the signal to the processor. The processor processes the signal, so that the display method according to any one of the foregoing possible implementations is performed.

It may be understood that, to implement the foregoing functions, the electronic device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into modules is an example and is merely logical function division. During actual implementation, there may be another division manner.

An embodiment further provides a computer-readable storage medium. The computer-readable storage medium stores computer instructions. When the computer instructions are run on an electronic device, the electronic device is enabled to perform the related method steps, to implement the display method in the foregoing embodiments.

An embodiment further provides a computer program product. When the computer program product runs on a computer, the computer is enabled to perform the foregoing related steps, to implement the display method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the display method in the foregoing method embodiments.

The electronic device, the computer-readable storage medium, the computer program product, or the chip provided in embodiments is configured to perform the corresponding method provided above. Therefore, for beneficial effect that can be achieved, refer to the beneficial effect in the corresponding method provided above. Details are not described herein again.

Based on the foregoing descriptions of the implementations, a person skilled in the art may understand that, for the purpose of convenient and brief description, division into the foregoing functional modules is merely used as an example for illustration. During an actual application, the foregoing functions can be allocated to different functional modules for implementation based on a requirement, that is, an inner structure of an apparatus is divided into different functional modules to implement all or a part of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method comprising:
obtaining a first operation;
running, in response to the first operation, a first application;
displaying a first interface of the first application in a form of a first floating window, wherein the first interface comprises a first title bar and a first content display part;
obtaining a second operation; and
displaying, in response to the second operation, a second interface by extending the first interface within the first floating window, wherein the second interface comprises the first title bar, the first content display part, and a second content display part adjacent to the first content display part,
wherein the first title bar comprises a first subtitle label corresponding to the second content display part.

2. The method of claim 1, wherein before displaying the second interface, the method further comprises obtaining, in response to the second operation, the first subtitle label using a first configuration file.

3. The method of claim 1, wherein before displaying the second interface, the method further comprises generating, in response to the second operation, the first subtitle label.

4. The method of claim 1, wherein the first subtitle label is highlighted in the first title bar, comprises a first label name and a first control for closing the second content display part, and is located above the second content display part.

5. The method of claim 4, further comprising:
obtaining a third operation; and
displaying, in response to the third operation, a third interface comprising the first title bar, the first content display part, and a third content display part adjacent to the first content display part, wherein the first title bar further comprises a highlighted second subtitle label, wherein the highlighted second subtitle label comprises a second label name and a second control for closing the third content display part, and wherein the first subtitle label is non-highlighted.

6. The method of claim 5, further comprising displaying, in response to the fourth operation, the second interface, wherein the first subtitle label is highlighted, and wherein the second subtitle label is non-highlighted.

7. The method of claim 1, wherein the first content display part comprises a first side length in a first direction, wherein the second content display part comprises a second side length in the first direction, wherein a sum of the first side length and the second side length is less than or equal to a length of a side that is of a display desktop of an electronic device and that is parallel to the first direction.

8. The method of claim 7, wherein the first side length is less than or equal to the second side length.

9. The method of claim 8, wherein the first side length and the second side length are adjustable.

10. The method of claim 1, further comprising:
obtaining a third operation;
running, in response to the third operation, a second application; and
displaying a third interface of the second application in the form of a second floating window.

11. An electronic device, comprising:
one or more memories configured to store instructions; and
one or more processors coupled to the one or more memories and configured to execute the instructions to cause the electronic device to:
obtain a first operation;
run, in response to the first operation, a first application;
display a first interface of the first application in a form of a first floating window, wherein the first interface comprises a first title bar and a first content display part;
obtain a second operation; and
display, in response to the second operation, a second interface by extending the first interface within the first floating window, wherein the second interface comprises the first title bar, the first content display part, and a second content display part adjacent to the first content display part,
wherein the first title bar comprises a first subtitle label corresponding to the second content display part.

12. The electronic device of claim 11, wherein the one or more processors are further configured to execute the instructions to cause the electronic device to obtain, in response to the second operation, the first subtitle label using a first configuration file.

13. The electronic device of claim 11, wherein the one or more processors are further configured to execute the instructions to cause the electronic device to generate, in response to the second operation, the first subtitle label.

14. The electronic device of claim 11, wherein the first subtitle label is highlighted in the first title bar, comprises a first label name and a first control for closing the second content display part, and is located above the second content display part.

15. The electronic device of claim 14, wherein the one or more processors are further configured to execute the instructions to cause the electronic device to:
obtain a third operation; and
display, in response to the third operation, a third interface comprising the first title bar, the first content display part, and a third content display part adjacent to the first content display part, wherein the first title bar comprises a highlighted second subtitle label, wherein the first subtitle label is non-highlighted, and wherein the highlighted second subtitle label comprises a second label name and a second control for closing the third content display part.

16. The electronic device of claim 15, wherein the one or more processors are further configured to execute the instructions to cause the electronic device to:
obtain a fourth operation of a user; and
display, in response to the fourth operation, the second interface, wherein the first subtitle label is highlighted, and wherein the second subtitle label is non-highlighted.

17. The electronic device of claim 11, wherein the first content display part comprises a first side length in a first direction, wherein the second content display part comprises a second side length in the first direction, and wherein a sum of the first side length and the second side length is less than or equal to a length of a side that is of a display desktop of the electronic device and that is parallel to the first direction.

18. The electronic device of claim 17, wherein the first side length is less than or equal to the second side length.

19. The electronic device of claim 18, wherein the first side length and the second side length are adjustable.

20. The electronic device of claim 11, wherein the one or more processors are further configured to execute the instructions to cause the electronic device to:
   obtain a third operation;
   run, in response to the third operation, a second application; and
   display, in response to running the second application, a third interface of the second application in the form of a second floating window.

* * * * *